United States Patent [19]

Iso et al.

[11] Patent Number: 5,260,671
[45] Date of Patent: Nov. 9, 1993

[54] RECEIVING CIRCUIT FOR DEMODULATING AN ANGLE MODULATED SIGNAL

[75] Inventors: Yoshimi Iso, Chigasaki; Nobutaka Amada, Yokohama; Masaki Noda, Chigasaki, all of Japan

[73] Assignee: Hitachi, Ltd., Tokyo, Japan

[21] Appl. No.: 883,466

[22] Filed: May 15, 1992

[30] Foreign Application Priority Data

May 17, 1991 [JP] Japan .................... 3-112855
Jun. 27, 1991 [JP] Japan .................... 3-156427

[51] Int. Cl.$^5$ ............................................. H03D 3/00
[52] U.S. Cl. .................................. 329/302; 329/307; 329/308; 331/22; 331/23; 375/90; 375/97; 375/120
[58] Field of Search ............... 329/300, 301, 302, 303, 329/304, 305, 306, 307, 308, 309, 310; 375/80, 81, 82, 84, 83, 85, 86, 87, 88, 89, 90, 91, 97, 98, 120; 331/22, 31, 23; 455/131, 202, 207, 209, 260, 314, 315, 316

[56] References Cited

U.S. PATENT DOCUMENTS

| 4,048,566 | 9/1977 | Carson et al. | 325/329 |
| 4,527,127 | 7/1985 | Brown | 329/308 |
| 4,642,573 | 2/1987 | Noda et al. | 375/120 X |
| 4,696,056 | 9/1987 | Morita | 455/182 |
| 4,713,630 | 12/1987 | Matthews | 331/4 |
| 4,871,973 | 10/1989 | Yoshihara | 329/308 |
| 4,916,405 | 4/1990 | Keate et al. | 329/308 |

FOREIGN PATENT DOCUMENTS 0136152 6/1987 Japan .
0030049 2/1988 Japan .

OTHER PUBLICATIONS

IETJ Technical Report vol. 11; No. 13; pp. 7-12; TEBS 87-24 Nov. 1987.

Primary Examiner—David Mis
Attorney, Agent, or Firm—Antonelli, Terry, Stout & Kraus

[57] ABSTRACT

A receiving circuit is designed for an MSK (Minimum Shift Keying) receiver and a QPSK (Quadrature Phase Shift Keying) receiver. The circuit provides a synchronous state determining device and a control voltage sweeping device for sweeping the output of a voltage oscillator. In the asynchronous state, a switch is turned off for interrupting a reproducing phase error signal so that the output of the voltage oscillator may be swept for causing the synchronous state. Then, the sweeping operation is stopped and the switch is turned on for controlling the voltage of the voltage controlled oscillator so that the low-frequency error component is removed from the phase error signal of the demodulating circuit. This results in implementing the simply-arranged demodulating circuit which keeps the proper demodulating performance against the shifted carrier frequency without any degrade and demodulates the input signal stably if the signal has a low C/N ratio. This circuit is capable of stably demodulating an MSK signal from a broadcasting satellite or a communication satellite.

26 Claims, 18 Drawing Sheets

RECEIVING CIRCUIT FOR DEMODULATING AN ANGLE MODULATED SIGNAL

BACKGROUND OF THE INVENTION

The present invention relates to a receiving circuit to be used for a MSK (Minimum Shift Keying) receiver or QPSK (Quadrature Phase Shift Keying) receiver, and more particularly to a demodulating circuit which operates to stably demodulate a digital angle modulated signal under the drifting condition of a an intermediate-frequency resulting from the drift of a local oscillator and to provide an intermediate-frequency signal required for demodulating a suppressed-carrier double sideband signal, the demodulating circuit being proper to a heterodyne receiver for receiving a signal from a broadcasting satellite or a communication satellite.

A Communication Satellite (CS) audio broadcasting system capable of doing PCM broadcasting in a multi-channel manner employs a direct frequency modulation system for directly modulating a carrier in the overlapped condition of multi-channel signals. The CS audio broadcasting system employs an electromagnetic wave MSK-modulated at a transmission rate of 24,576 Mbps. In order to reduce the fixed deterioration, the coherent detection type demodulating circuit for a digital angle modulated wave such as a MSK-modulated wave or a QPSK-modulated wave normally has a carrier recovery circuit whose capture range is designed to be as narrow as several hundreds kHz. On the other hand, a frequency converter is, in general, located immediately after an antenna for the purpose of reducing a cable loss after receiving a wave from the satellite. Since the frequency converter has a local oscillator, it is necessary to consider about ±1.5 MHz of frequency variation appearing in the local oscillator. To compensate for the frequency variation, a pull-in circuit is required to be installed for synchronizing the received signal. In addition, the demodulating performance greatly depends on the frequency variation.

An example of a demodulating circuit for stably demodulating the MSK-modulated signal has been disclosed in JP-A-63-30049. This circuit is arranged so that another converter is provided in addition to an antenna converter; a selection converter and a phase error signal of the MSK demodulating circuit is fed back to the additional converter. That is, the circuit has a three-stage heterodyne arrangement. FIG. 1 shows this circuit. The antenna converter is not shown in FIG. 1. As shown, 1 is an input terminal. 2 is a first local oscillator. 3 is a first mixer, 4 is a second local oscillator. 5 is a second mixer. 6 is a band-pass filter (BPF). 7 is a first multiplier. 8 is a second multiplier. 9 is a reference oscillator. 10 is a $\pi/2$ phase shifter. 11 is a first low-pass filter (LPF). 12 is a second LPF. 13 is a first discriminating circuit. 14 is a second discriminating circuit. 15 is an inverter. 16 is a digital signal processing circuit. 17 is an output terminal for a reproduced signal. 18 is a third multiplier. 19 is a fourth multiplier. 20 is a loop filter. 21 is a clock recovery circuit. 22 is a MSK demodulating circuit. The demodulating circuit shown in FIG. 1 is arranged to have a first and a second frequency converting circuits. The first frequency converting circuit is composed of the first local oscillator 2 and the first mixer 3. The second frequency converting circuit is composed of the second local oscillator 4 and the second mixer 5. The first and the second frequency converting circuits serve to lower a carrier frequency in a dual heterodyne manner in which two frequencies are prepared for an intermediate frequency. Though the operation of the demodulating circuit is not descriptive in detail, the input modulated signal is converted into first and second intermediate frequencies. The first multiplier 7 serves to multiply the signal converted into the second intermediate frequency by a in-phase carrier generated in the reference oscillator 9. The second multiplier 8 serves to multiply the signal converted into the second intermediate frequency by a quadrature carrier generated in the $\pi/2$ phase shifter 10. That is, the first and the second multiplier 7 and 8 perform the synchronous wave detection and produce an in-phase component and a quadrature component, respectively. Then, the third multiplier 18 serves to multiply the in-phase component by the quadrature component. The multiplied result of the third multiplier 18 is sent to the fourth multiplier 19 in which it is further multiplied by a clock signal recovered in the clock recovery circuit 21. Those multipliers 7, 8, 18, 19 compose a negative feed-back loop for keeping a constant phase difference between the second middle frequency and the output of the reference oscillator 9. This prior art may use a highly-stable crystal oscillator as the reference oscillator 9. Hence, if the frequency of the first local oscillator 2 is drifted due to the ambient temperature variation or the temperature variation resulting from the electronic conduction, the negative feed-back loop makes the second intermediate frequency stable. This prior art is capable of recovering the carrier and demodulating a modulated wave if the intermediate frequency is drifted as a result of drifting the first local oscillator of the heterodyne receiver. However, this prior art cannot sufficiently compensate for the drift of the antenna converter. Hence, if the drift may appear in the range of several megahertz, the demodulating performance is degraded. FIG. 2 shows a relation between a bit error rate (BER) and a detuning frequency, which shows a demodulating performance. As shown in a curve (a) of FIG. 2, the BER characteristic degrades as the frequency goes farther from the center. As shown in a curve (b) of FIG. 2, the degrading amount can be reduced as the loop gain is made larger. If the loop gain is made too large, however, a noise-caused erroneous operation may result if a C/N (Carrier to Noise Ratio) is low. Hence, the modulating circuit has difficulty in synchronizing the signals when the C/N is made lower.

An example of a pull-in circuit for compensating for the detuning phenomenon resulting from the frequency drift has been disclosed in JP-A-62-136152. As shown in FIG. 3, this pull-in circuit is provided in the modulating circuit for the QPSK-modulated signal and is arranged so that when a synchronous state is not detected in a digital signal processing unit, a low-frequency sweep signal is pulled into the modulating circuit in a manner of being overlapped with a control voltage of a voltage controlled oscillator included in the QPSK carrier recovery circuit. If the synchronous state is detected, the supply of the sweep signal is stopped. In FIG. 3, 101 is an antenna through which an electromagnetic wave on the band of 12 GHz is received. 102 and 103 are antenna converters. Specifically, 102 corresponds a mixer and 103 corresponds to a local oscillator. The mixer 102 serves to convert the received wave into a signal on the band of 1 GHz. 105 is a band-selecting local oscillator. 104 is another mixer. The mixer 104 serves to convert the signal into the signal on the band of 400 MHz. 106 is a band-pass filter for restricting a band. 107 is a QPSK demodulating circuit. 113 is a loop filter. 114 is a voltage controlled oscillator for recovering a carrier. 108 is a digital signal processing unit. 109 is a synchronous pattern detector included in the signal processing unit 108. When the QPSK demodulating circuit 107 enters into a synchronous state, the synchronous pattern is detected and the synchronous pattern detector 109 outputs a detection signal. This QPSK demodulating circuit 107 has a capture range of about ±500 kHz and a locked range of about ± several megahertz (MHz). If the local oscillator 103 drifts excessively, the demodulating circuit 107 cannot carry out the synchronous pull-in operation. To overcome this disadvantageous state, a low-frequency oscillator 110, a switch 111, and an adder 112 are provided. If no synchronous pattern is detected, the switch 111 is turned on for adding a low-frequency signal into a carrier phase error signal and sweeping the voltage controlled oscillator 114.

This prior art utilizes the characteristics appearing when the capture range is narrow and the locked range is wide. The capture range may be apparently made wider. This arrangement makes it possible to pull in the low-frequency sweep signal if the carrier frequency is shifted from the center. However, the demodulating performance against the frequency shift is degraded as shown in FIG. 2. Further, this circuit arrangement has a shortcoming that a signal spectrum is cut out and the demodulating performance is more degraded accordingly if the input carrier frequency is shifted, because the band-pass filter 106 for restricting the band located at the previous stage of the QPSK demodulating circuit has a fixed frequency.

The MSK modulated signal is a phase-serial FSK signal. Hence, it can be considered as a kind of FM wave. An automatic frequency control (AFC) AFC circuit is arranged in light of this feature. That is, the AFC circuit operates to FM-detect the input signal and feed back the error signal obtained by comparing the detected signal with the reference frequency to a band-selecting local oscillator. FIG. 4 shows the prior art disclosed in ITEJ Technical Report Vol.11, No.31, pp 7-12, TEBS'87-24 November 1987. In FIG. 4, 101 is an antenna through which an electromagnetic wave on the band of 12 GHz is received. This signal is sent to a down converter in which the signal is converted into a signal on the band of 1 GHz. The resulting signal is sent to a mixer 104. 105 is a PLL synthesizer type local oscillator which serves to select the band from the signal and convert the signal into the signal on the band of 140 MHz. Then, the 140-MHz signal is input to a MSK demodulating circuit 115 through a band-pass filter 106 for restricting the band. If the input frequency is shifted, no synchronous pull-in operation is carried out. Hence, the AFC circuit shown in FIG. 4 is used. Since the MSK signal is a kind of FM wave, the band-restricted signal is divided by the FM detector 116 and the divided frequency is compared with a reference frequency 117 for accurately knowing the direction and the amount of the frequency shift. Herein, the input signal is divided into 64 and further into 256. Then, the 256-divided signal is compared with the reference frequency of 8.545 kHz. The microcomputer 118 serves to control the band-selecting local oscillator of a PLL synthesizer type for the purpose of absorbing the frequency shift.

The feature of this prior art is that a high-precision digital FM detector provided independently of the MSK demodulating circuit makes the AFC operation possible even if the MSK demodulating circuit is not in the conducting state. However, this type of system has a shortcoming that if the input signal has an inferior C/N, the input signal cannot be accurately divided, that is, the AFC operation is made impossible if the input signal has an inferior C/N, though the digital type FM detection can achieve more accurate detection. Another shortcoming is that a circuit arrangement becomes complicated, because it is necessary to provide a high-precision FM detecting circuit leased for the AFC operation. As a further shortcoming, this arrangement does not prepare any FM detecting operation for the QPSK signal. Hence, it is inoperative to the QPSK signal.

As mentioned above, the disclosed prior art have a disadvantage that the demodulating performance is degraded if the carrier frequency of the digital angle modulated signal is shifted from the center frequency as being caused by the frequency drift of the antenna converter (outdoor unit). As the loop gain is made far higher, the operation becomes unstable if the C/N ratio is low. Further, for the MSK-modulated signal, it is possible to provide a high-precision FM detector leased for the AFC operation in order that the demodulating performance may be kept stable if the carrier frequency is shifted. However, the high-precision FM detector also operates unstably if the C/N ratio is low.

In particular, the prior art shown in FIG. 1 is capable of reproducing a carrier and demodulating a modulated wave if the intermediate frequency drifts as the first local oscillator of the heterodyne receiver drifts. However, the heterodyne receiver for receiving a signal from the broadcasting satellite or the communication satellite includes the third mixer and the local oscillator as outdoor units and the first and the second mixers and the local oscillator as indoor units. The great drift may take place in the third local oscillator located outdoors. Moreover, in order to improve the interference characteristic against the recent increase of receiving channels, the BPF is located between the first and the second mixers. If the drift may take place in the second and the third local oscillators, the attenuation of the sideband wave in the BPF results in disadvantageously increasing the error ratio of the reproduced signal.

SUMMARY OF THE INVENTION

It is a main object of the present invention to provide a simple-arrangement receiving and demodulating circuit for a digital angle modulated signal which is capable of treating a digital angle modulated signal including a MSK modulated signal and a QPSK signal, keeping the demodulating performance proper if the carrier frequency shifts and demodulating the signal precisely if the input signal has a low C/N ratio.

It is another object of the present invention to provide a heterodyne type MSK receiver which is capable of stably demodulating the MSK signal sent from the broadcasting satellite or the communication satellite.

In carrying out the objects, means for detecting a synchronous state and means for sweeping a voltage controlled oscillator are provided so that the output of the voltage controlled oscillator is swept for causing a synchronous state if the asynchronous state may take place. Then, the sweeping operation is stopped and the control voltage of the voltage controlled oscillator is controlled so that the low-frequency component is completely removed from a phase error signal in the demodulating circuit.

When the carrier frequency of the digital angle modulated signal shifts by several MHz from the center, the demodulating circuit has so narrow a capture range that the circuit may remain in the asynchronous state and therefore the phase error signal may contain no information. By sweeping the voltage controlled oscillator, the demodulating circuit is allowed to be entered into a synchronous state. In this case, the demodulating circuit has so wide a locked range that the phase error signal may transmit a phase error voltage for doing the coherent detection on an operating point of the frequency shifted from the central frequency. The low-frequency component of the phase error signal corresponds to the voltage for correcting the shift of the central frequency. By controlling a control voltage of the voltage controlled oscillator so that the low-frequency component voltage may be lowered, therefore, the operating point of the coherent detection done in the demodulating circuit is allowed to be moved near the center. If the carrier frequency shifts by several MHz as the drift occurs in the antenna converter, the demodulating circuit is capable of stably demodulating the digital angle modulated signal without a degradation in the demodulating performance.

Further, the foregoing objects can be achieved by detecting the variation of the oscillating frequency sent from the second local oscillator or the input frequency of the second mixer provided in the prior art, controlling the first location oscillator based on the detected variation, and keeping the oscillating frequency of the second local oscillator or the input frequency of the second mixer constant. To detect the variation of the oscillating frequency of the second local oscillator, it is possible to take the method of dividing the oscillating frequency of the second local oscillator and comparing the divided frequency with the reference frequency of the reference oscillator, measuring the oscillating frequency of the second local oscillator by using a binary counter, or comparing the d.c. component of the carrier phase error information, that is, the control voltage of the second local oscillator with the reference voltage. To detect the variation of the input frequency of the second mixer, it is possible to FM-detect the input signal of the second mixer and compare the d.c. component of the detected output signal with the reference voltage.

With the foregoing arrangement, the MSK-modulated signal having a frequency variation component resulting from the temperature change of the outdoor unit may have a stable middle frequency having no frequency variation through the effect of the first frequency converter circuit. If a BPF is located between the first and the second mixers, the BPF causes no attenuation of the side-band when the drift may take place in the second or the third local oscillator. Hence, the MSK demodulating circuit operates in the most proper state, resulting in being able to prevent the error ratio of the reproduced signal from being degraded.

BRIEF DESCRIPTION OF THE DRAWINGS

Preferred embodiments of the present invention will now be described in conjunction with these accompanying drawings, in which.

DESCRIPTION OF THE PREFERRED EMBODIMENTS

Figure 5:
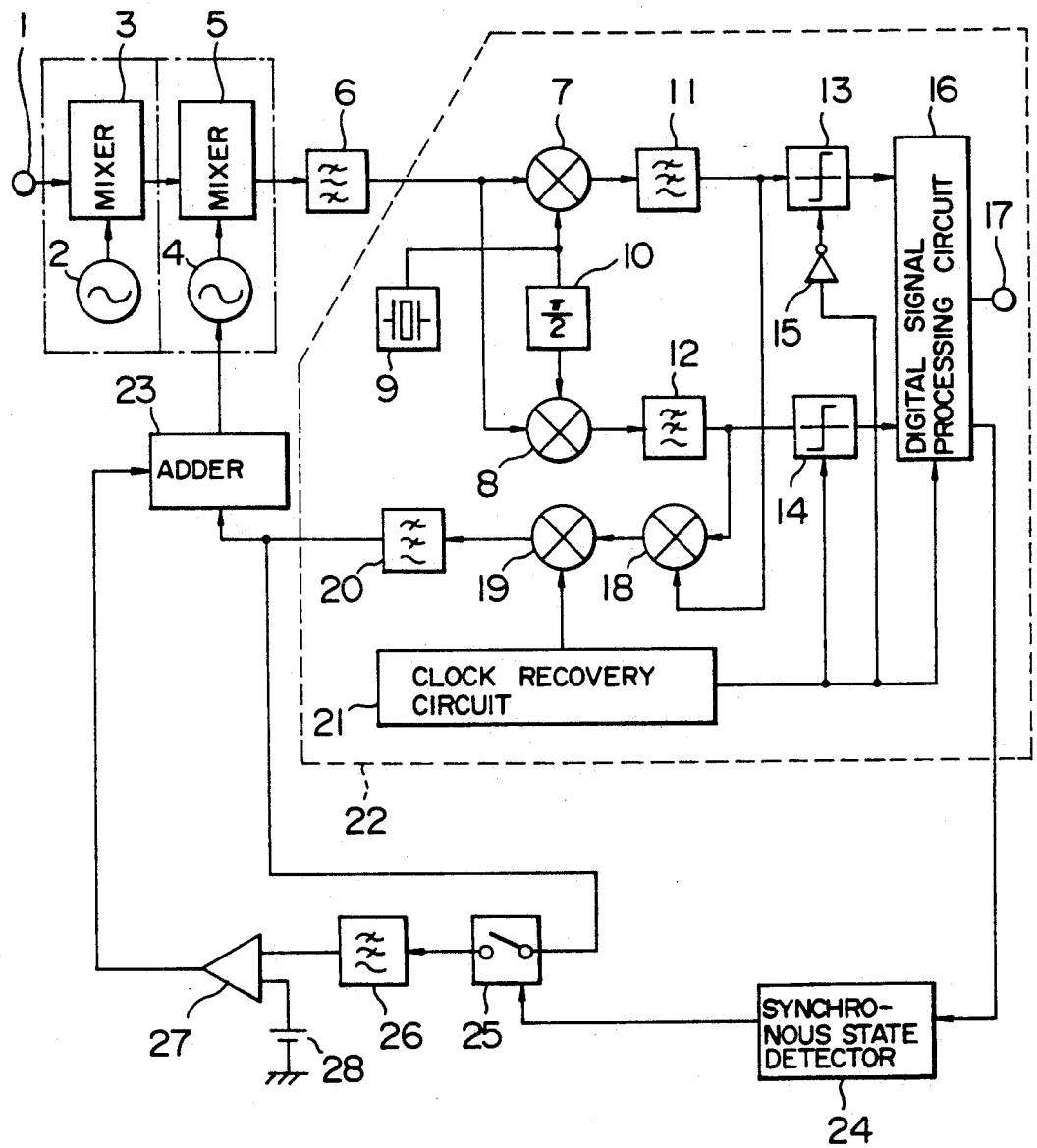
FIG. 5 is a block diagram showing a receiving circuit according to a first embodiment of the present invention.

FIG. 5 is a block diagram showing a receiving and circuit according to a first embodiment of the present invention. An outdoor unit comprising an antenna, a local oscillator and a mixer is located out of the figure. The shown indoor unit accepts a first middle frequency (1-GHz band) converted from a signal transmitted from a broadcasting satellite or a communication satellite. The same symbols are given to the same function blocks as those shown in FIG. 1 (prior art). In FIG. 5, 1 is an input terminal. 2 is a first local oscillator. 3 is a first mixer. 4 is a second local oscillator. 5 is a second mixer.

6 is a band-pass filter (BPF). 7 is a first multiplier. 8 is a second multiplier. 9 is a reference oscillator. 10 is a $\pi/2$ phase shifter. 11 is a first low-pass filter (LPF). 12 is a second LPF. 13 is a first discriminating circuit. 14 is a second discriminating circuit. 15 is an inverter. 16 is a digital signal processing circuit. 17 is an output terminal for a reproduced signal. 18 is a third multiplier. 19 is a fourth multiplier. 20 is a loop filter. 21 is a clock recovery circuit. 22 is a MSK demodulating circuit. The circuit arrangement shown in FIG. 5 includes a first and a second frequency converting circuits. The first frequency converting circuit comprises the first local oscillator 2 and the first mixer 3. The second frequency converting circuit comprises the second local oscillator 4 and the second mixer 5. The circuit shown in FIG. 5 operates to lower a carrier frequency in a dual heterodyne manner having two middle frequencies, enter the lowered frequency to the MSK demodulating circuit 22 and demodulate an MSK signal. Herein, a signal at the input terminal is a signal on the band of 1 GHz. The signal is selected in the mixer 3 so that the signal on the 1-GHz band is converted into the signal on the band of 400 MHz. Then, the mixer 5 serves to convert the 400-MHz band into a signal on the band of 140 MHz.

Figure 1:
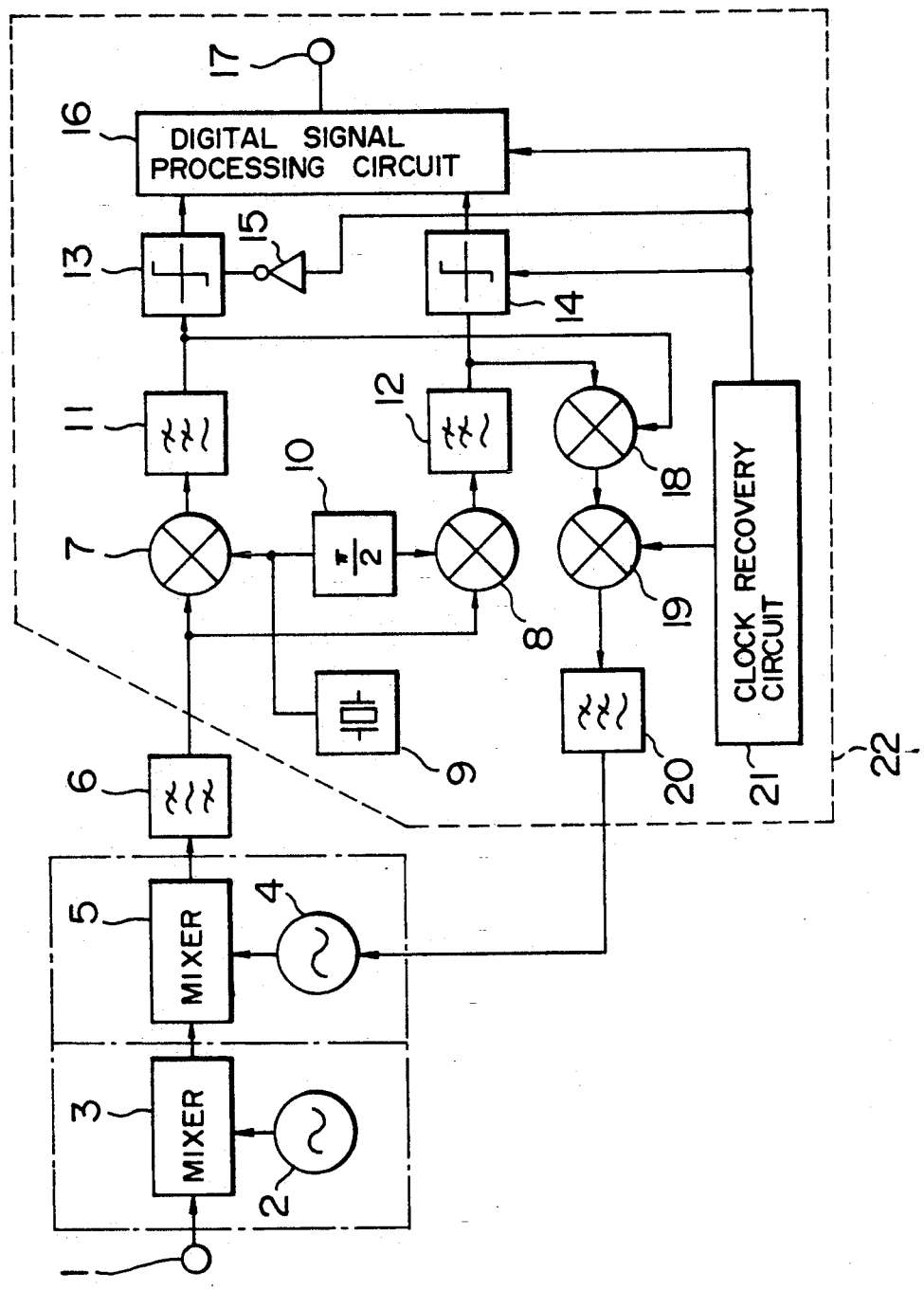
FIG. 1 is a block diagram showing a prior art.
Figure 2:
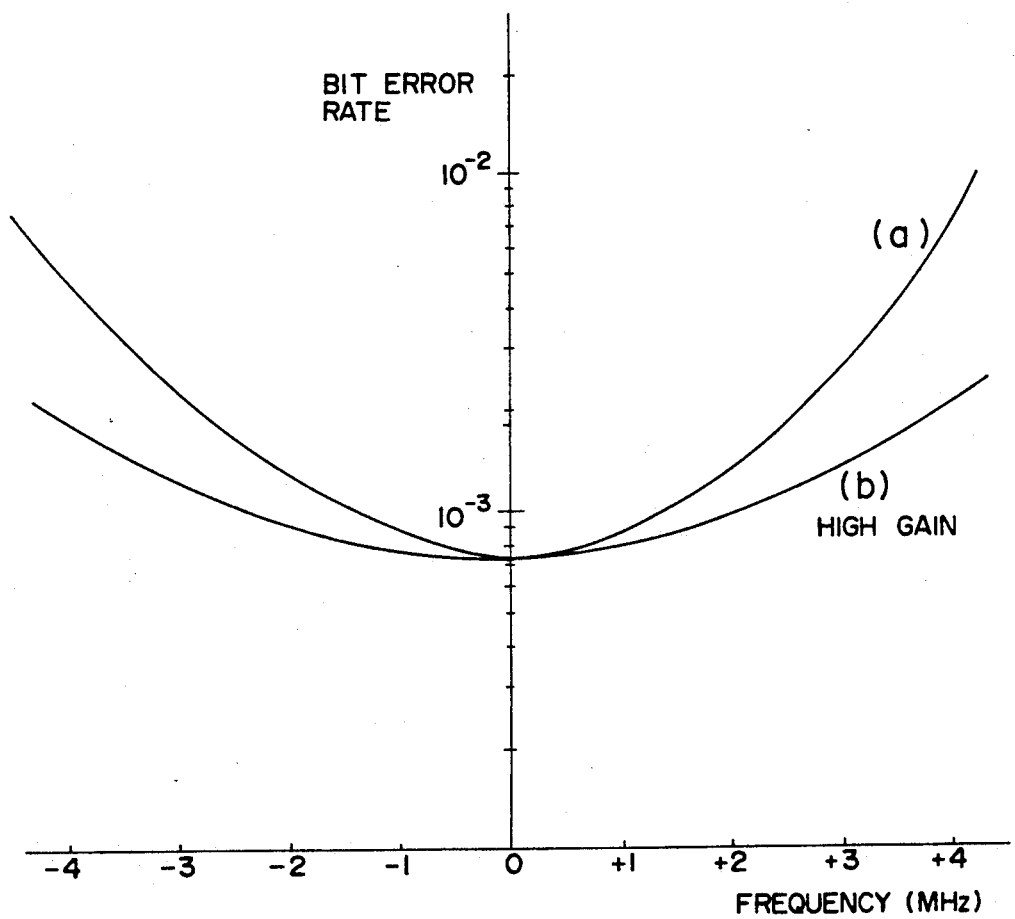
FIG. 2 is a graph showing a relation between a bit error rate (BER) and a detuning frequency in the prior art shown in FIG. 1.
Figure 3:
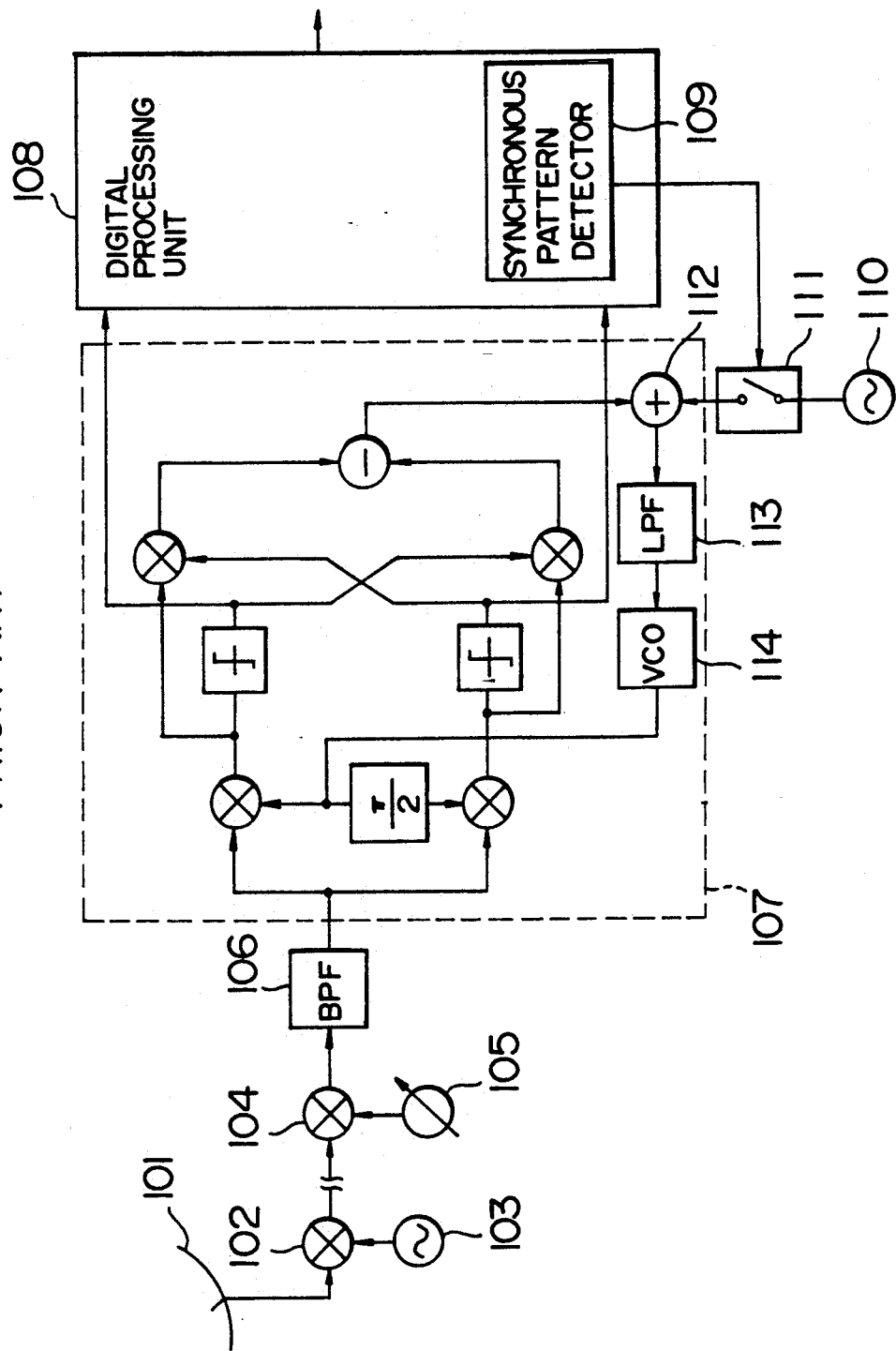
FIG. 3 is a block diagram showing another prior art.

The different respect of the arrangement in FIG. 5 from that in FIG. 1 is that there are provided a synchronous state detector 24, a switch 25, a low-pass filter 26, an amplifier 27 and an adder 23. The synchronous state detector 24 makes sure that the MSK demodulating circuit 22 keeps a synchronous state and obtains the information about the shifted input frequency. Then, the switch 25 is turned on. When the switch 25 is turned off, the loop filter 20 outputs a phase error signal for recovering a carrier, the signal containing an offset voltage corresponding to the shift of the input frequency. The MSK demodulating circuit 22 serves to perform the coherent detection on an operating point as a shifted-frequency point.

Figure 6:
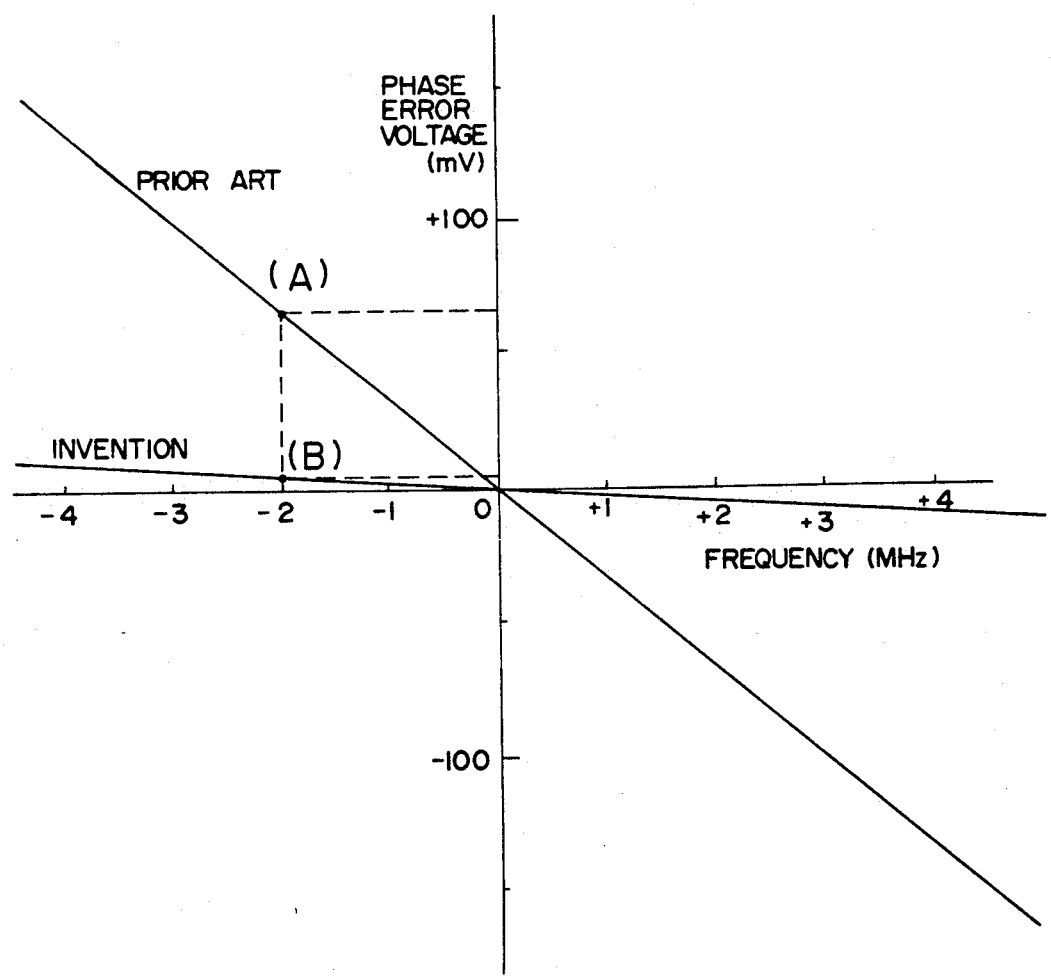
FIG. 6 is a graph showing a relation between a phase error voltage and a detuning frequency in the first embodiment.

FIG. 6 is a graph showing a relation between a phase error voltage and a detuning frequency in the demodulating circuit of this embodiment. FIG. 6 is a state of shifting the low-frequency component voltage of the phase error signal, which is an output of the loop filter 20, from the center of the carrier frequency. If $-2$ MHz is shifted from the center of the carrier frequency, the operating point is the (A) point shown in FIG. 6.

Figure 7:
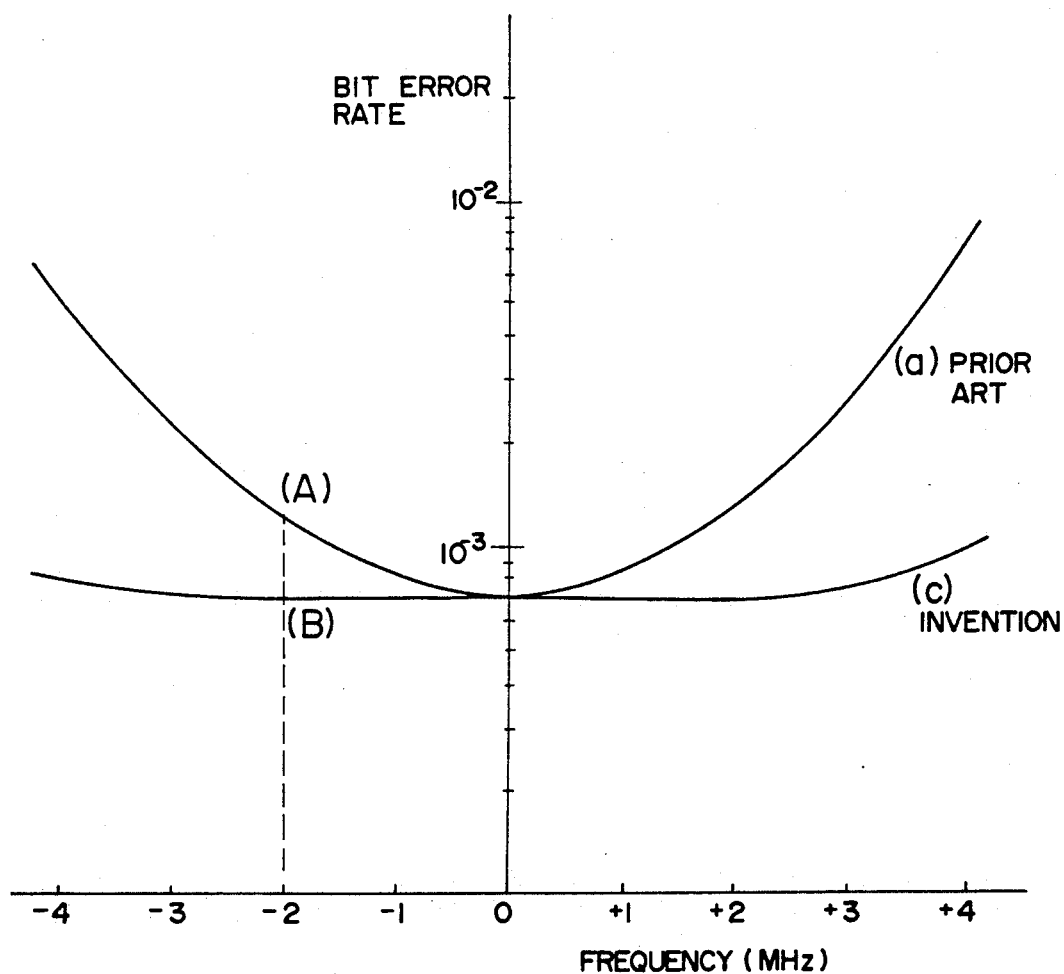
FIG. 7 is a graph showing a relation between a bit error rate (BER) and a detuning frequency in the first embodiment.

FIG. 7 is a graph showing a relation between a bit error rate (BER) and a detuning frequency in the demodulating circuit of this embodiment. It will be understood from this graph that the BER indicating the demodulating performance is made lower than to the (A) point of the frequency without shifting. When the switch is turned on, the low-frequency component of the phase error signal is input to the amplifier 27 through a low-pass filter 26 having a lower corner frequency than several Hz. That is, as a gain rises, the demodulating circuit malfunctions if the input signal contains too much noise. Hence, the gain rises only with respect to the super low frequency. As a result, the gain is raised for preventing the d.c. component error. The error against the high-frequency noise is cut through the effect of the low-pass filter 26.

Assuming that the gain of the amplifier is made 20 times larger, the low-frequency component of the phase error signal is amplified to be 20 times larger. The amplified signal is input to the adder 23 from which the signal is supplied as a control voltage to the voltage controlled oscillator 4 together with the phase error signal. 28 denotes a voltage source by which the voltage controlled oscillator outputs a central frequency. Hence, the phase error signal for controlling the voltage controlled oscillator 4 contains only the low-frequency component being amplified. The low-frequency component of the phase error signal of the loop filter 20 is reduced into 1/20. That is to say, the operating point (A) of FIG. 6 is moved to the point (B) at which the phase error voltage is reduced into 1/20. It means that the shift of 2 MHz corresponds to the shift of 100 kHz. The BER performance is moved to the point (B) of FIG. 7 at which the characteristic is kept proper without degrading.

As set forth above, this embodiment of the invention is capable of completely preventing the demodulating performance against the frequency shift from being degraded and keeping the gain of the phase error signal except the low-frequency component. Hence, this embodiment is able to keep the stable operation when the input signal has a low C/N ratio.

Figure 8:
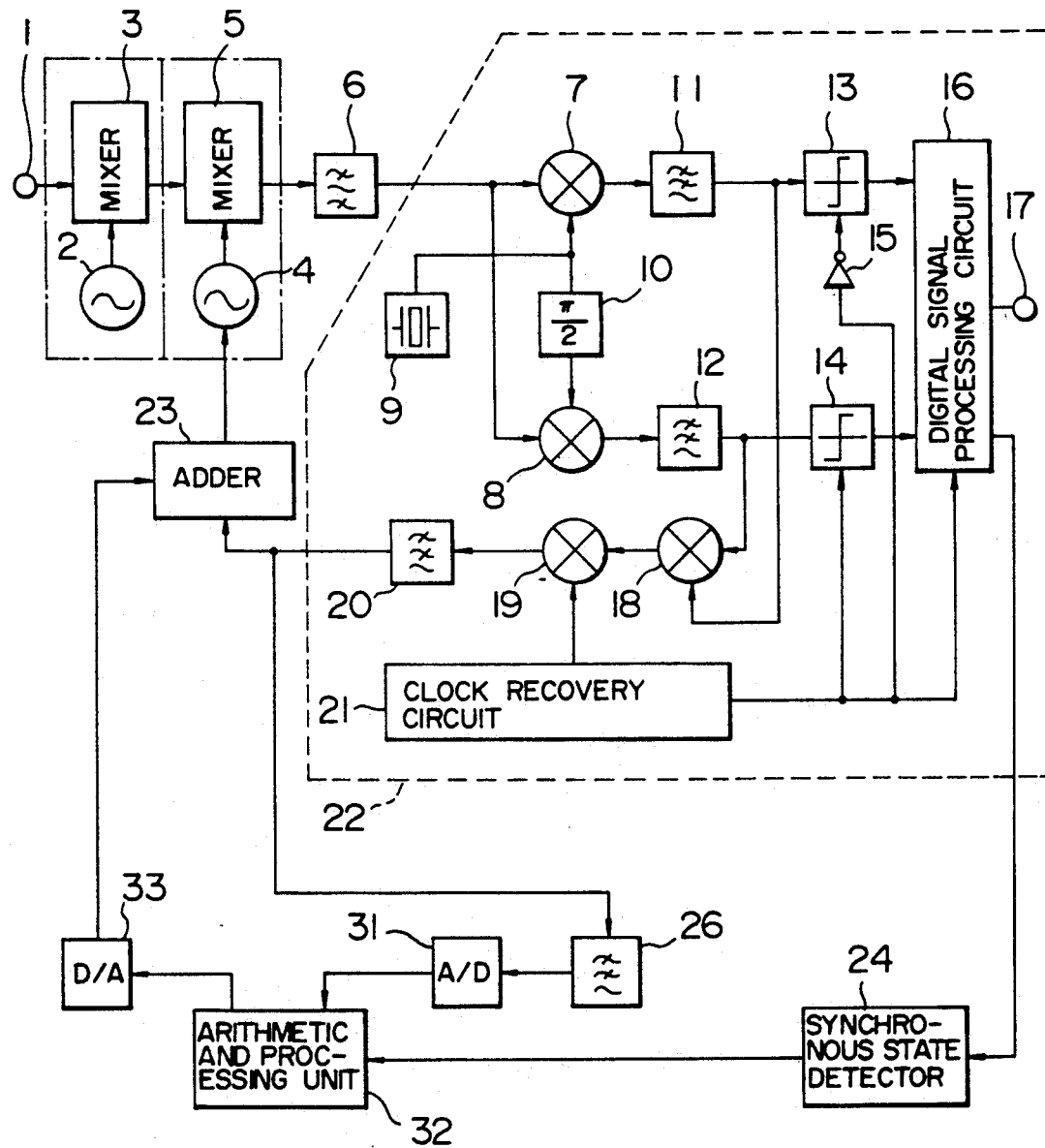
FIG. 8 is a block diagram showing a receiving circuit according to a second embodiment of the present invention.

FIG. 8 is a block diagram showing a receiving circuit according to a second embodiment of the present invention. This embodiment operates on the same principle as the first embodiment shown in FIG. 5. The different respect of the arrangement shown in FIG. 8 from the arrangement shown in FIG. 5 is that the loop comprising the switch 25, the low-pass filter 26 and the amplifier 27 (see FIG. 5) is replaced with the loop comprising a low-pass filter 26, an A/D converter 31, an arithmetic and processing circuit 32 and a D/A converter 33. The output of the low-pass filter 26 is A/D converted into the digital signal by the A/D converter 31. The digital signal is supplied to the arithmetic and processing circuit 32. The circuit 32 serves to amplify the signal, add the amplified signal to the data corresponding to a reference voltage, and output the added result to the D/A converter 33 under the control of the detected output of the synchronous state detector 24. Then, the D/A converter 33 serves to convert the added result into an analog signal and output the analog signal to the adder 23.

When the coherent detection is carried out, the operation of the arithmetic and processing circuit 32 corresponds to the operation done when the switch 25 is turned on in the first embodiment (see FIG. 5). When the coherent detection is not carried out, the operation of the arithmetic and processing circuit 32 corresponds to the operation done when the switch 25 is turned off in the first embodiment (see FIG. 5). Hence, the second embodiment shown in FIG. 8 offers the same effect as the first embodiment shown in FIG. 5.

Figure 9:
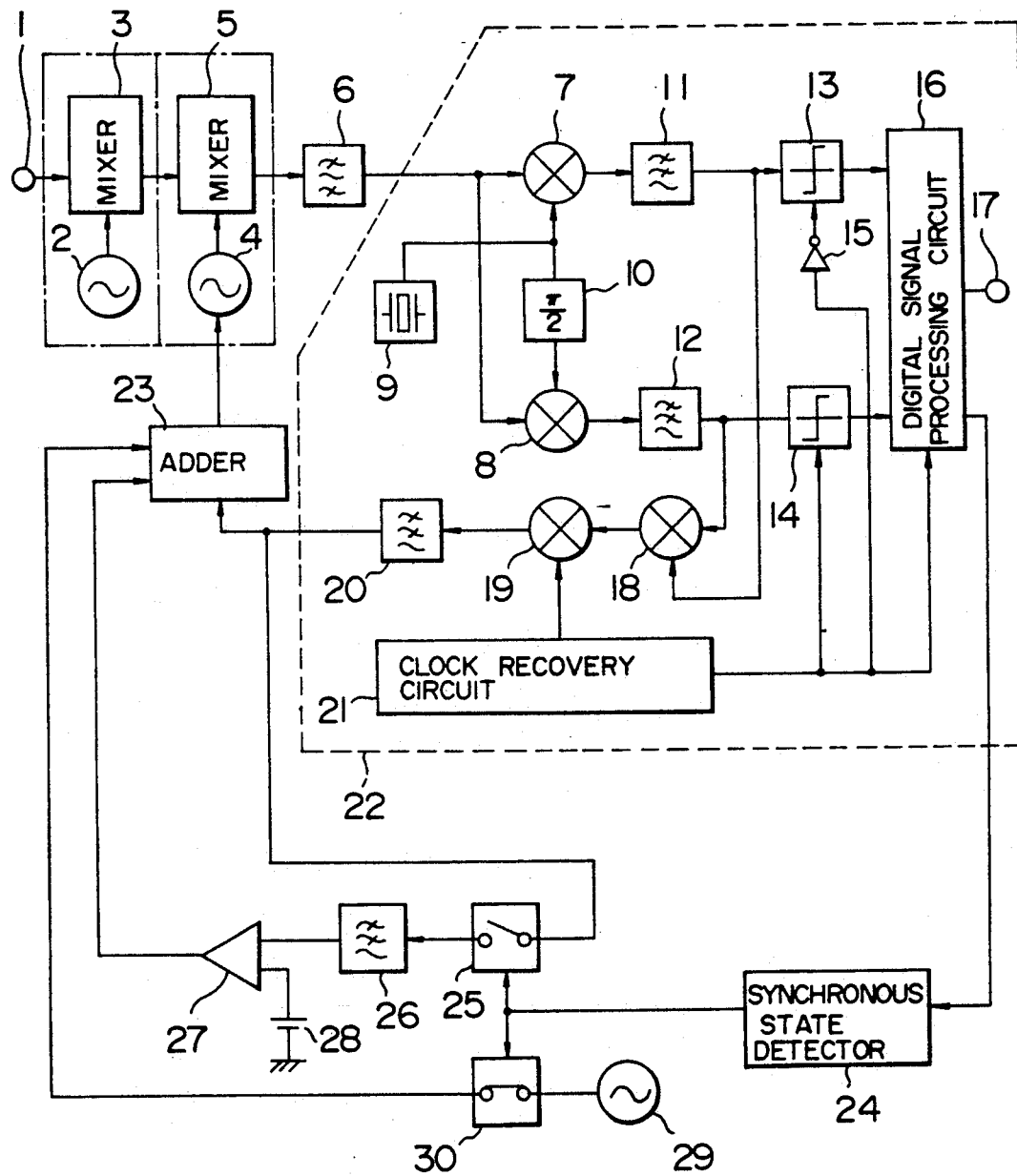
FIG. 9 is a block diagram showing a receiving circuit according to a third embodiment of the present invention.

FIG. 9 shows a receiving circuit according to a third embodiment of the present invention. The circuit includes a pull-in circuit added to the embodiment shown in FIG. 5. The circuit shown in FIG. 5 permits the loop filter 20 to output the information about the frequency shift only when the MSK (Minimum Shift Keying) demodulating circuit enters into a synchronous state. It means that the MSK demodulating circuit is required to enter into the synchronous state.

For the requirement, there are provided a low-frequency oscillator 29 and a switch 30 as shown in FIG. 9. When the output of the synchronous state detector 24 is not in the synchronous state, the switch 25 is turned off and the switch 30 is turned on so that a sine wave or triangular wave of several Hz is allowed to be entered into the adder 23. Since the reference voltage is output from the amplifier 27, the voltage controlled oscillator 4 serves to sweep the frequency into the center of the central frequency. If the input signal stays in the range of the swept frequency, the MSK demodulating circuit enters into a synchronous state. Then, when the switch 30 is turned off and the switch 25 is turned on, the embodiment shown in FIG. 9 operates in the substantially same manner as the first embodiment shown in FIG. 5.

Figure 10:
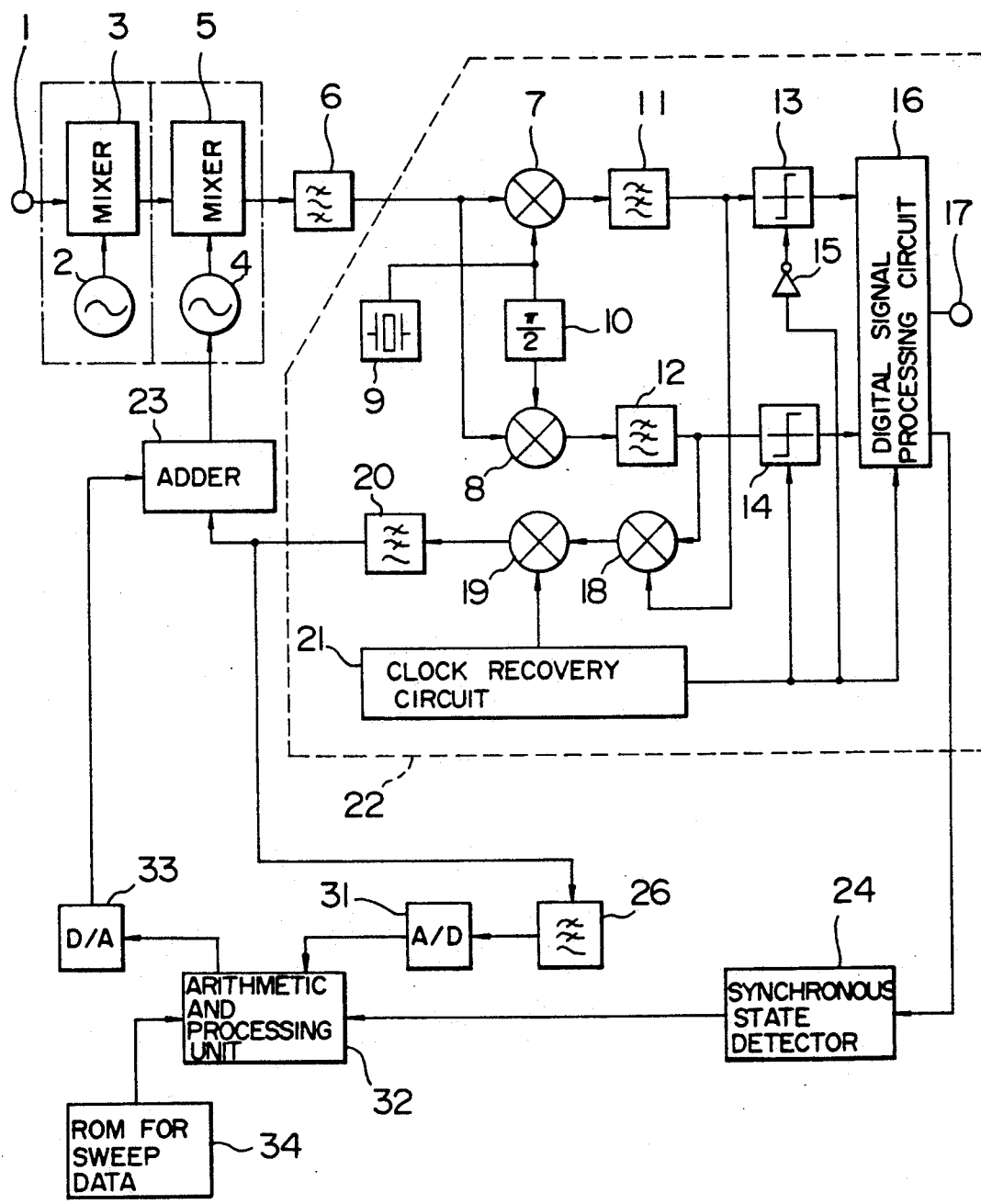
FIG. 10 is a block diagram showing a receiving circuit according to a fourth embodiment of the present invention.

FIG. 10 shows a receiving circuit according to a fourth embodiment of the present invention. In this embodiment, the pull-in circuit is added to the circuit shown in FIG. 8. This fourth embodiment operates in the same manner as the third embodiment shown in FIG. 9. A ROM 34 for storing the sweep data is provided in the circuit shown in FIG. 8. In the asynchronous state, the arithmetic and processing circuit 32 serves to add the data for the reference voltage to the data read from the ROM 34. The added result is input to the voltage controlled oscillator 4 so that the voltage controlled oscillator 4 is swept based on the signal from the circuit 32, thereby allowing the oscillator 4 to enter into the synchronous state.

Figure 11:
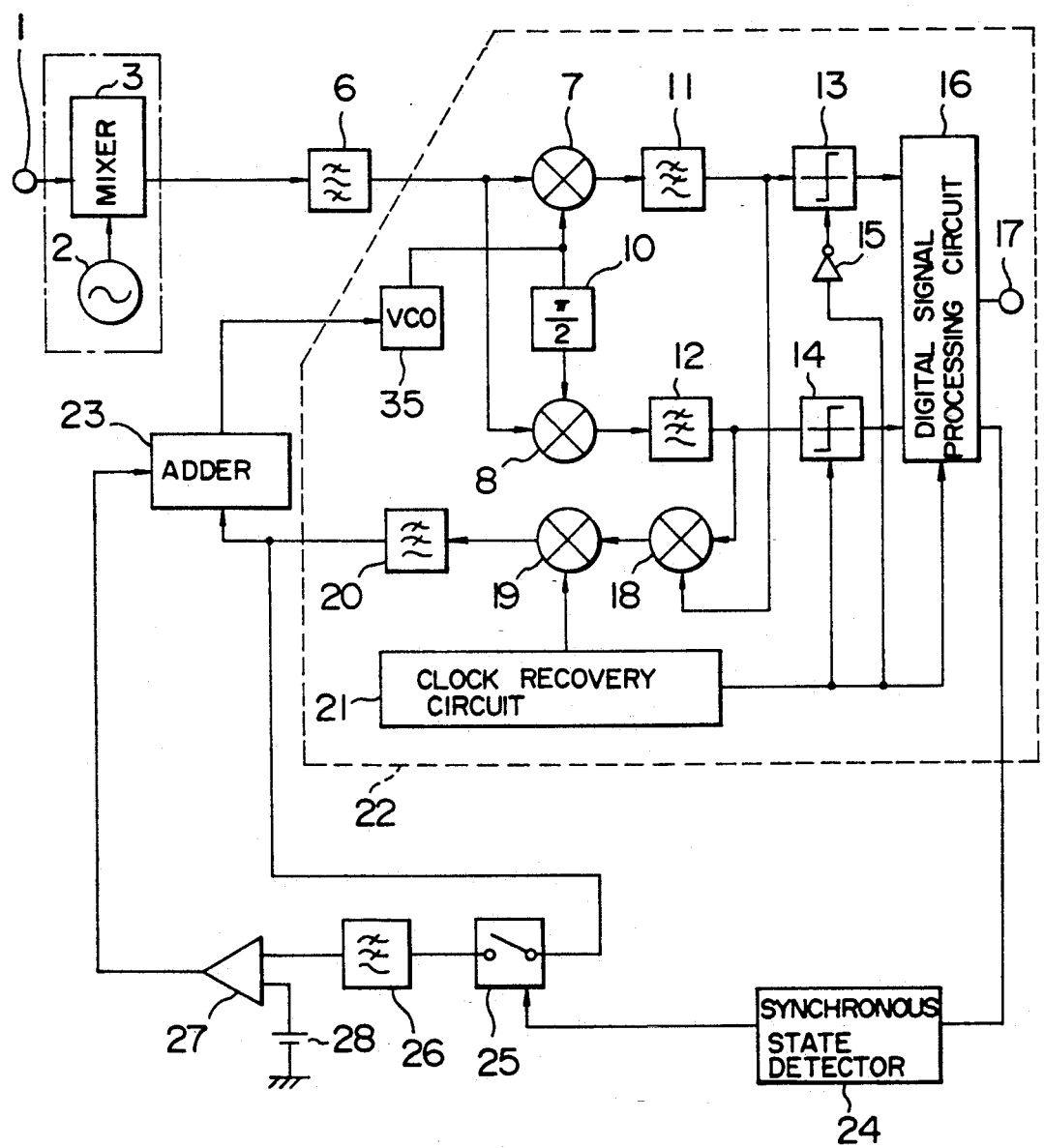
FIG. 11 is a block diagram showing a receiving circuit according to a fifth embodiment of the present invention.

FIG. 11 shows a receiving circuit according to a fifth embodiment of the present invention. The different respect of the fifth embodiment from the first embodiment shown in FIG. 5 is the absence of the second local oscillator 4 and the second mixer 5 (see FIG. 5). The reference oscillator 9 is replaced with a voltage controlled oscillator 35. That is, the fifth embodiment is an application of this invention into a general MSK receiver. This results in suppressing the degradation of the demodulating performance against the shifted frequency. However, since the band-pass filter 6 may shift the central frequency, the spectrum of the input signal may be cut out. If, therefore, the frequency is greatly shifted, the demodulating performance may be degraded. For overcoming the degrade, it is necessary to design the band width of the band-pass filter 6 to be broader. The broader band of the filter 6 puts the present invention into effective force.

Figure 12:
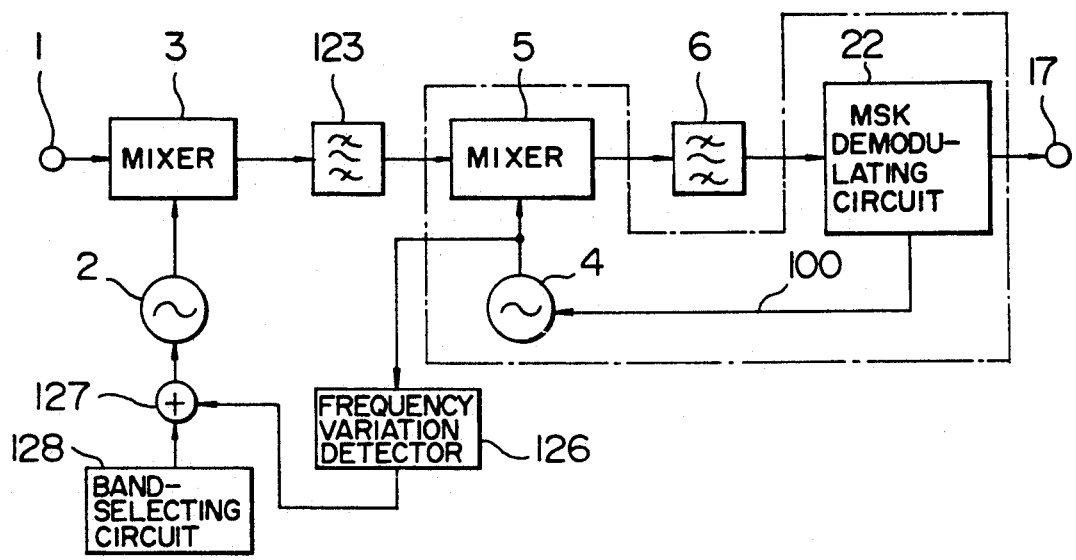
FIG. 12 is a block diagram showing a receiving circuit according to a sixth embodiment of the present invention.

FIG. 12 is a block diagram showing a receiving circuit according to a sixth embodiment of the present invention. An outdoor unit is located out of the figure. The outdoor unit is arranged to have an antenna, a local oscillator and a mixer. FIG. 6 shows an indoor unit which accepts a first intermediate frequency converted from a signal transmitted from a broadcasting satellite or a communication satellite. The indoor unit shown in FIG. 12 has the same functional blocks as those shown in FIG. 1, which have the same reference numbers. In FIG. 12, 1 is an input terminal at which the middle frequency is input. 2 is a first local oscillator. 3 is a first mixer. 4 is a second local oscillator. 5 is a second mixer. 6 is a second band-pass filter (BPF). 17 is an output terminal for a reproduced signal. 22 is an MSK demodulating circuit. 123 is a first band-pass filter. 126 is a frequency variation detector. 127 is an adder. 128 is a band-selecting circuit. 100 is a carrier phase error signal. The first middle frequency signal is applied at the input terminal 1 and a desired frequency are input to the mixer 3. The desired frequency is generated by a local oscillator 2 under the control of the band-selecting circuit 128. The mixer 3 serves to produce a second intermediate frequency signal and output it to the BPF 123. The BPF 123 rejects the unnecessary noises and disturbance signals located out of the band. The resulting second intermediate frequency is converted into a third intermediate frequency signal by the mixer 5 and the local oscillator 4. Then, the BPF 6 serves to shape the third intermediate frequency signal in a manner to optimize the characteristics of a transmission path. The shaped signal is input to the MSK demodulating circuit 22. The reproduced signal is output from the terminal 17. The MSK demodulating circuit 22 feeds back the carrier phase error signal 100 to the local oscillator 4 so that the local oscillator 4 may be controlled depending on the carrier phase error signal 100. The output of the local oscillator 4 is branched into the mixer 5 and the frequency variation detector 126. The detector 126 serves to detect the variation by referring to the reference frequency of the local oscillator 4. Then, the detector 126 outputs to the adder 127 the error information corresponding to the variation. The adder 127 serves to add the error information signal to the band-selecting information sent from the band-selecting circuit 128 for the purpose of correcting the variation. This results in a negative feedback loop for correcting the variation. In the operation of the sixth embodiment of the invention, as stated with respect to the prior art, the local oscillator 4 is constantly corrected by the carrier phase error signal 100 to prevent the variation of the third intermediate frequency resulting from the variation of the second intermediate frequency. Hence, the oscillating frequency of the local oscillator 4 follows the variation of the second intermediate frequency. The frequency variation detector 126 serves to detect the difference between the oscillating frequency generated by the local oscillator 4 and the predetermined reference frequency. The adder 127 serves to add the band-selecting information to the correction for the local oscillator 2 obtained from the frequency variation detector 126 so as to correct the oscillating frequency of the local oscillator 2. As a result, the second intermediate frequency, that is, an output of the mixer 3 is allowed to be constantly kept as a normal central frequency independently of the variation of the first intermediate frequency. The local oscillator 4 enables to supply an oscillating output having an excellent S/N ratio, because the carrier phase error signal 100 is used for the negative feedback control. Further, if the input signal has a low C/N (Carrier to Noise Ratio), the frequency variation detector 126 has a low error rate.

Figure 13:
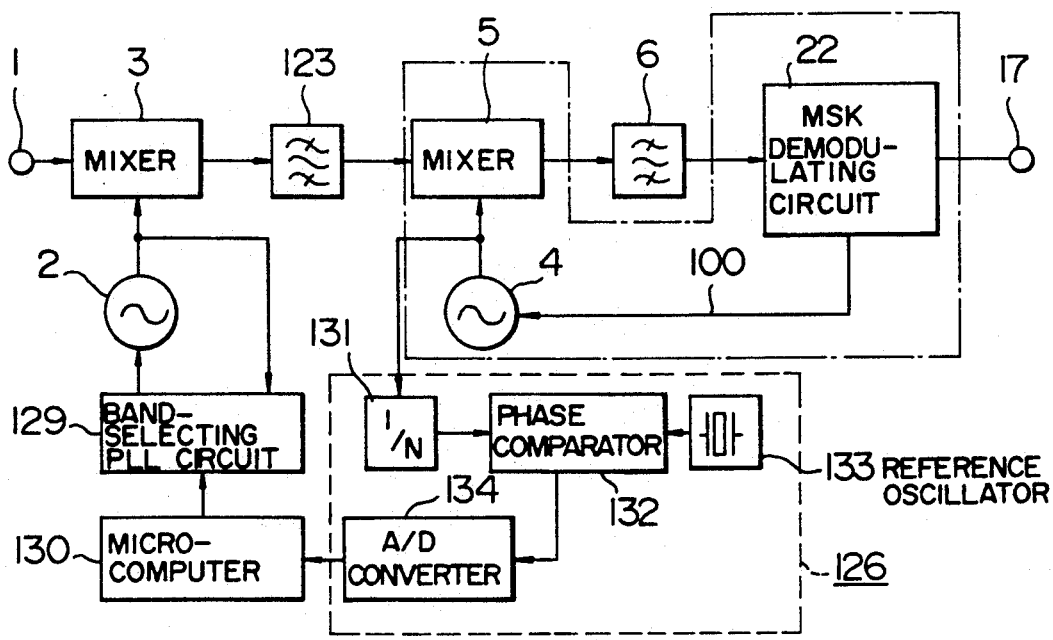
FIG. 13 is a block diagram showing a transformation of the embodiment shown in FIG. 12.

FIG. 13 is a block diagram showing one transformation of the sixth embodiment shown in FIG. 12. The same functional blocks shown in FIG. 13 as those shown in FIG. 12 have the same reference numbers. 129 is a band-selecting PLL circuit. 130 is a microcomputer. 131 is a frequency divider. 132 is a phase comparator. 133 is a reference oscillator. 134 is an A/D converter. In FIG. 13, the adder 127 and the band-selecting circuit 128 shown in FIG. 12 are replaced with the band-selecting phase locked loop (PLL) circuit 129 and the microcomputer 130. The frequency variation detector 126 is arranged to have the frequency divider 131, the phase comparator 132, the reference oscillator 133, and the A/D converter 134. The fundamental operation of the band-selecting system comprising the band-selecting PLL circuit 129 and the microcomputer 130 will be roughly described below. It will not be described in detail, because it is well known to those skilled in the art. The band-selecting PLL circuit 129 and the local oscillator 2 comprise a PLL. The PLL loop serves to keep the oscillating frequency of the local oscillator 2 highly stable. The microcomputer 130 controls a programmable divider for switching a frequency-dividing ratio. Based on the ratio, the oscillating frequency of the local oscillator is divided. The programmable divider is included inside of the band-selecting PLL circuit 129. As shown, the output of the local oscillator 4 is branched into the mixer 5 and the frequency divider 131. The output is divided into 1/N in the frequency divider 131. The divided frequency is sent to the phase comparator 132 in which it is compared in phase with the reference frequency generated in the reference oscillator 133. The output of the phase comparator 132 corresponds to the variation of the oscillating frequency. The output of the phase comparator 132 is converted into a digital signal in the A/D converter 134. In response to the signal sent from the A/D converter 134, the microcomputer 130 serves to switch the frequency-dividing ratio of the programmable divider. On the switched ratio, the oscillating frequency of the local oscillator 2 is controlled so that the second intermediate frequency may be kept as a normal central frequency.

Figure 14:
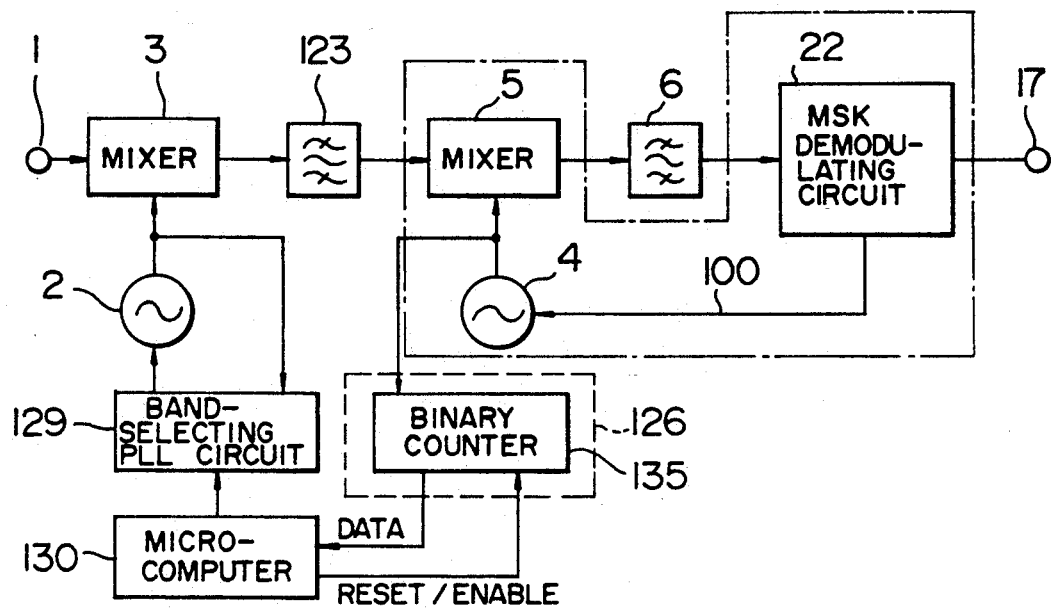
FIG. 14 is a block diagram showing a transformation the embodiment shown in FIG. 12.

FIG. 14 is a block diagram showing another transformation of the sixth embodiment shown in FIG. 12. The same functional blocks shown in FIG. 14 as those shown in FIG. 12 have the same reference numbers. The adder 127 and the band-selecting circuit 128 shown in FIG. 12 are replaced with the band-selecting PLL circuit 129 and the microcomputer 130 like the arrangement shown in FIG. 13. The frequency variation detector 126 comprises a binary counter 135. The binary counter 135 serves to shape the oscillating signal of the local oscillator 4 and count the signal during a predetermined period. Then, the microcomputer 130 serves to detect the number of counts of the oscillating signal of the local oscillator 4 and the variation of the second intermediate frequency as compared to the normal central frequency, switch the frequency-dividing ratio of the programmable divider and control the oscillating frequency of the local oscillator 2 based on the switched ratio for keeping the second intermediate frequency as a normal central frequency. The programmable divider is included in the band-selecting PLL circuit 129.

Figure 15:
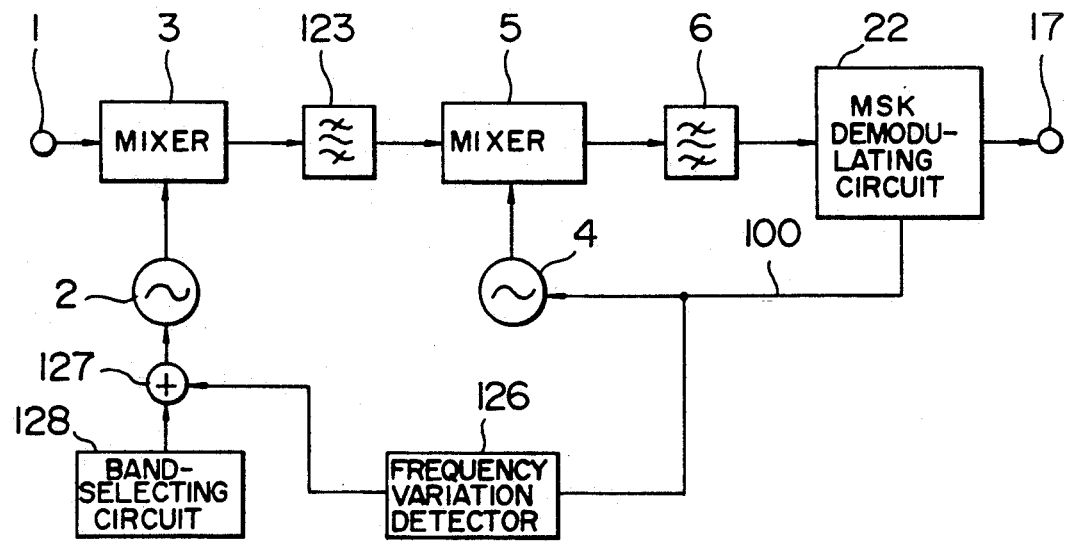
FIG. 15 is a block diagram showing a demodulating circuit according to a seventh embodiment of the present invention.

FIG. 15 is a block diagram showing a receiving circuit according to a seventh embodiment of the present invention. The same functional blocks shown in FIG. 15 as those shown in the other drawings have the same reference numbers. In FIG. 15, the carrier phase error signal 100 is input to the frequency variation detector 126, because the signal 100, which is a control signal of the local oscillator 4, follows the variation of the second intermediate frequency. By comparing the reference voltage with the carrier phase error signal 100, therefore, it is possible to detect the variation of the second intermediate frequency, control the local oscillator 2 like the embodiment shown in FIG. 12, and stabilize the second intermediate frequency.

Figure 16:
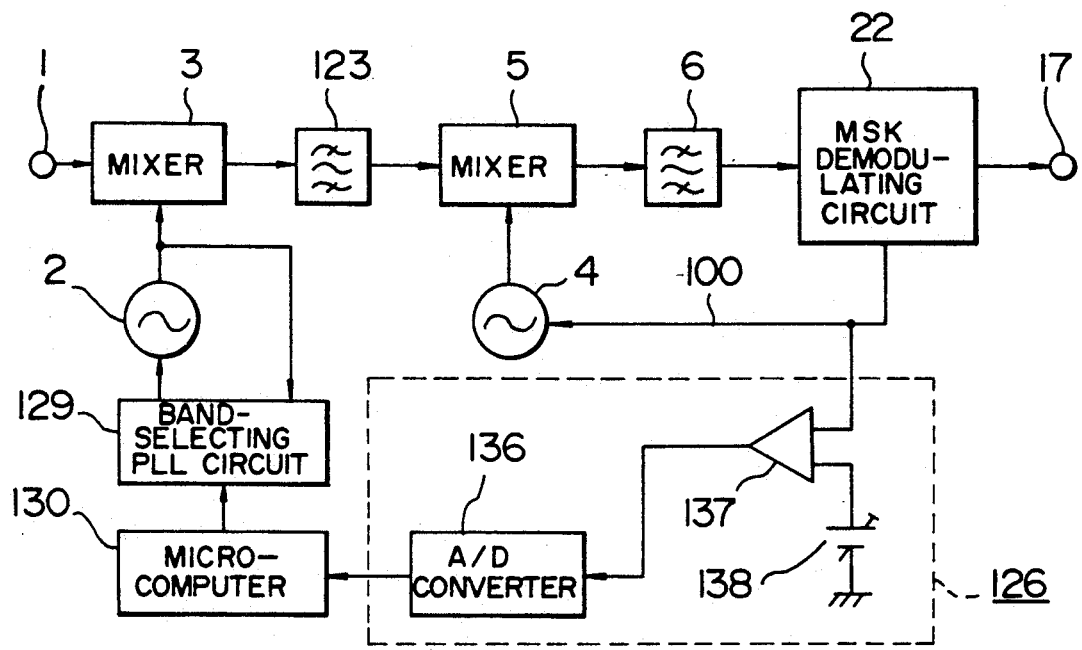
FIG. 16 is a block diagram showing a transformation of the embodiment shown in FIG. 15.

FIG. 16 is a block diagram showing a transformation of the seventh embodiment shown in FIG. 15. The same functional blocks shown in FIG. 16 as those shown in the other drawings have the same reference numbers. In FIG. 16, the frequency variation detector 126 is arranged to have an A/D converter 136, a comparator 137 comprising an operational amplifier, and a reference voltage generator 138. The comparator 137 serves to compare the reference voltage of the generator 138 with the carrier phase error signal 100. The output of the comparator 137 follows the variation of the oscillating frequency of the local oscillator 4. The output of the comparator 137 is converted into a digital signal in the A/D converter 136. In response to a signal sent from the A/D converter 136, the microcomputer 130 operates to control the programmable divider for switching the frequency-dividing ratio, control the oscillating frequency of the local oscillator 2 based on the switched ratio, and keep the second intermediate frequency as a normal central frequency. The programmable divider is included in the band-selecting PLL circuit 129.

Figure 17:
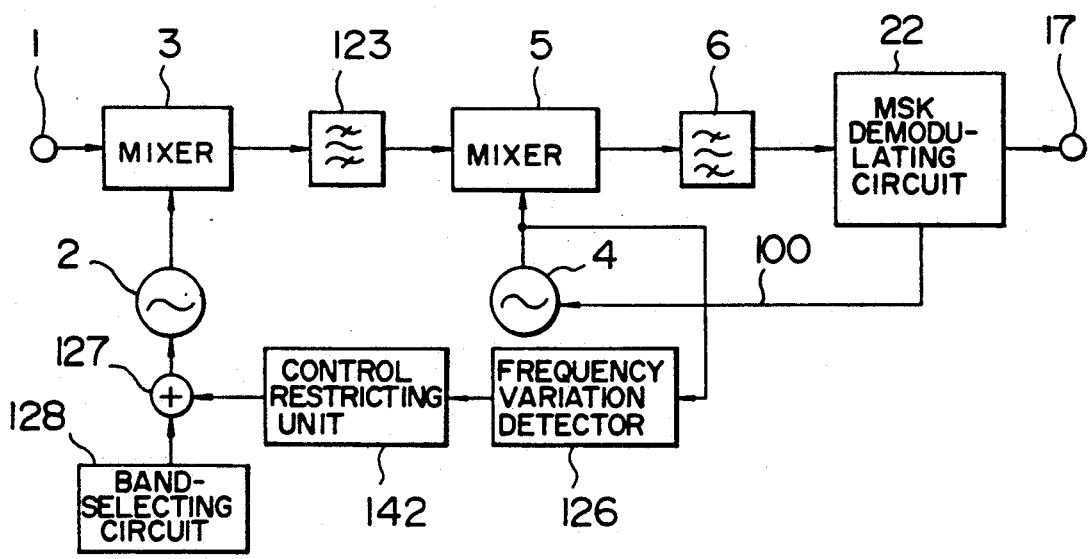
FIG. 17 is a block diagram showing a receiving circuit according to an eighth embodiment of the present invention.

FIG. 17 is a block diagram showing a demodulating circuit according to an eighth embodiment of the present invention. The same functional blocks shown in FIG. 17 as those shown in the other drawings have the same reference numbers. The different respect of the embodiment shown in FIG. 17 from that shown in FIG. 12 is that a control restricting unit 142 is located at the output of the frequency variation detector 126. The control restricting unit 142 operates to prevent the excessive control of the local oscillator 2 due to the carrier phase error signal 100 near the central frequency, as compared to the control operation of the local oscillator 4. The unit 142 further stops the control of the local oscillator 2 if the local oscillator is in a pseudo-locked state, that is, when the local oscillator 4 is erroneously controlled by the carrier phase error signal 100. This state is often brought about when the frequency of the local oscillator 4 is not stable such as when a power is turned on and when the band is being selected.

Figure 18:
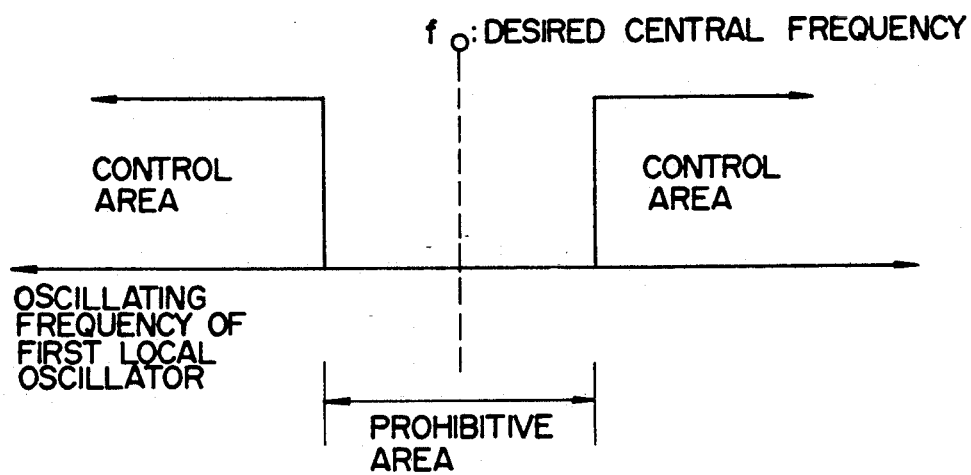
FIG. 18 is an explanatory view showing one operation of control restricting means shown in FIG. 17 for preventing the excessive control of the local oscillator 2 near the central frequency and a control range of the local oscillator 2.
Figure 19:
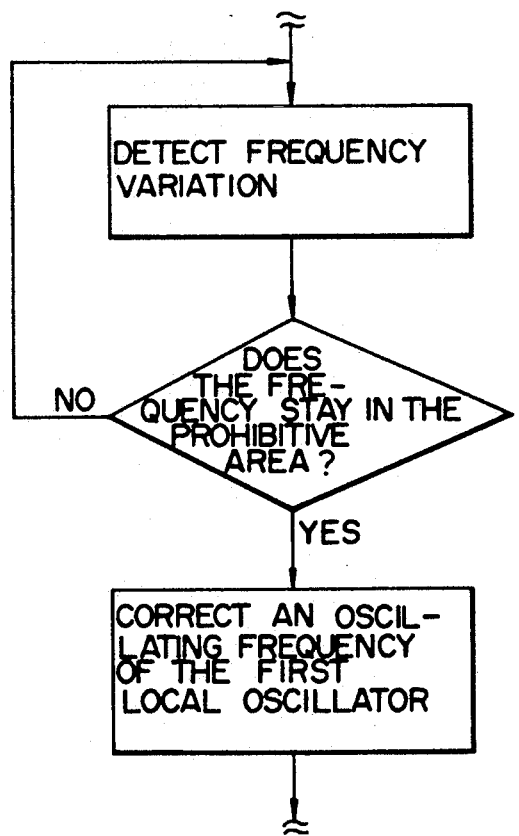
FIG. 19 is an explanatory view showing one operation of control restricting means shown in FIG. 17 for preventing excessive control of the local oscillator 2 near the central frequency and a control flowchart of a microcomputer 30.

FIGS. 18 and 19 are explanatory views showing one operation of the control restricting unit 142 when the unit prevents the excessive control of the local oscillator 2 due to the carrier phase error signal. FIG. 18 shows a control range of the local oscillator 2. As shown, the control restricting unit 142 serves to stop the control of the local oscillator 2 near the central frequency, control only the local oscillator 4 in response to the carrier phase error signal 100, and control the local oscillator 2 at the other area except the central frequency. FIG. 19 is a flowchart showing an operation of the microcomputer 130. The microcomputer 130 and the band-selecting PLL circuit 129 (see the embodiment shown in FIG. 13) comprise a band-selecting system.

Figure 20:
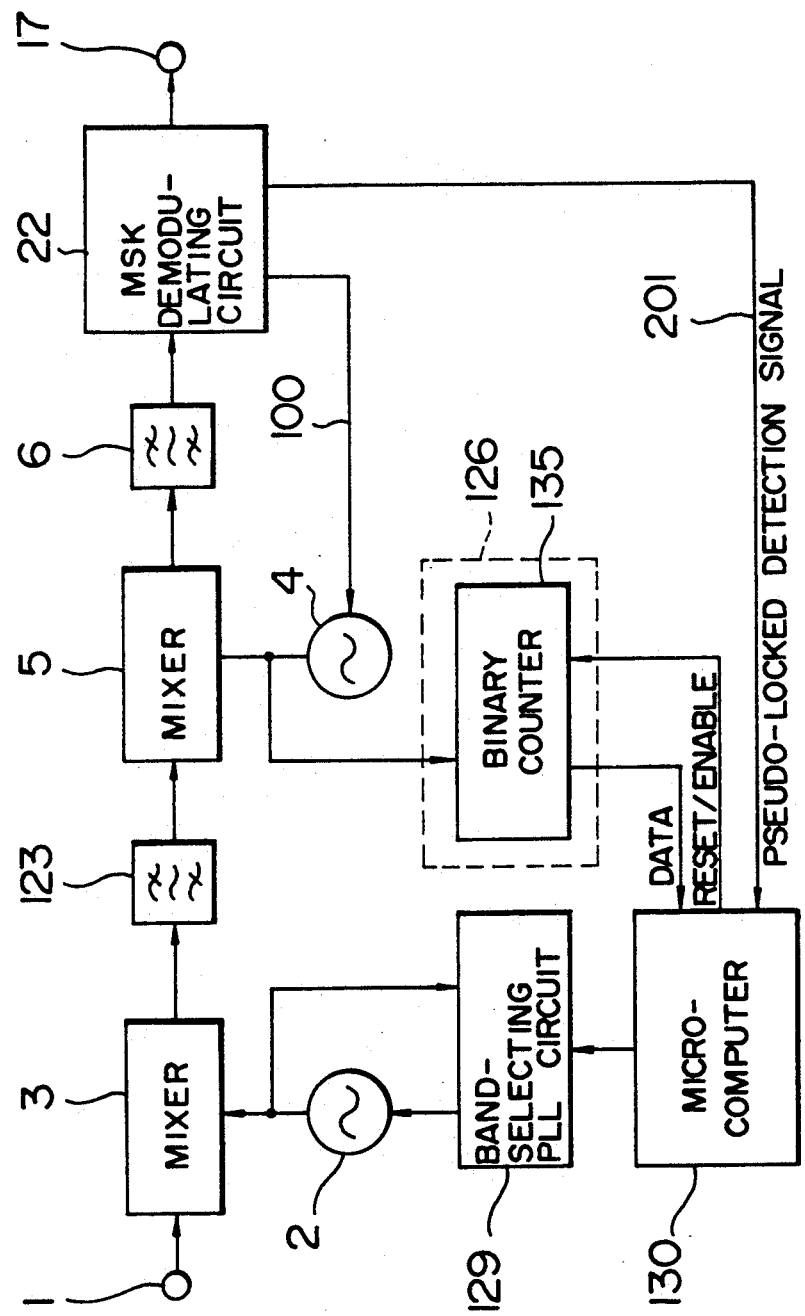
FIG. 20 is a block diagram showing a transformation of the embodiment shown in FIG. 17.

FIG. 20 is a block diagram showing a transformation of the eighth embodiment shown in FIG. 17. The same functional blocks shown in FIG. 17 as those shown in the other drawings have the same reference numbers. The different respect of the arrangement shown in FIG. 20 from the embodiment shown in FIG. 17 is that a pseudo-locking signal 201 is obtained from the MSK demodulating circuit 22 and is used for controlling the microcomputer 130. According to this arrangement, when the MSK demodulating circuit 22 outputs the pseudo-locking signal 201, the microcomputer 130 serves to prohibit the control of the local oscillator 2 based on the oscillating output of the local oscillator 4. Herein, the operation of the control restricting unit 42 is executed in the microcomputer 130.

Figure 21:
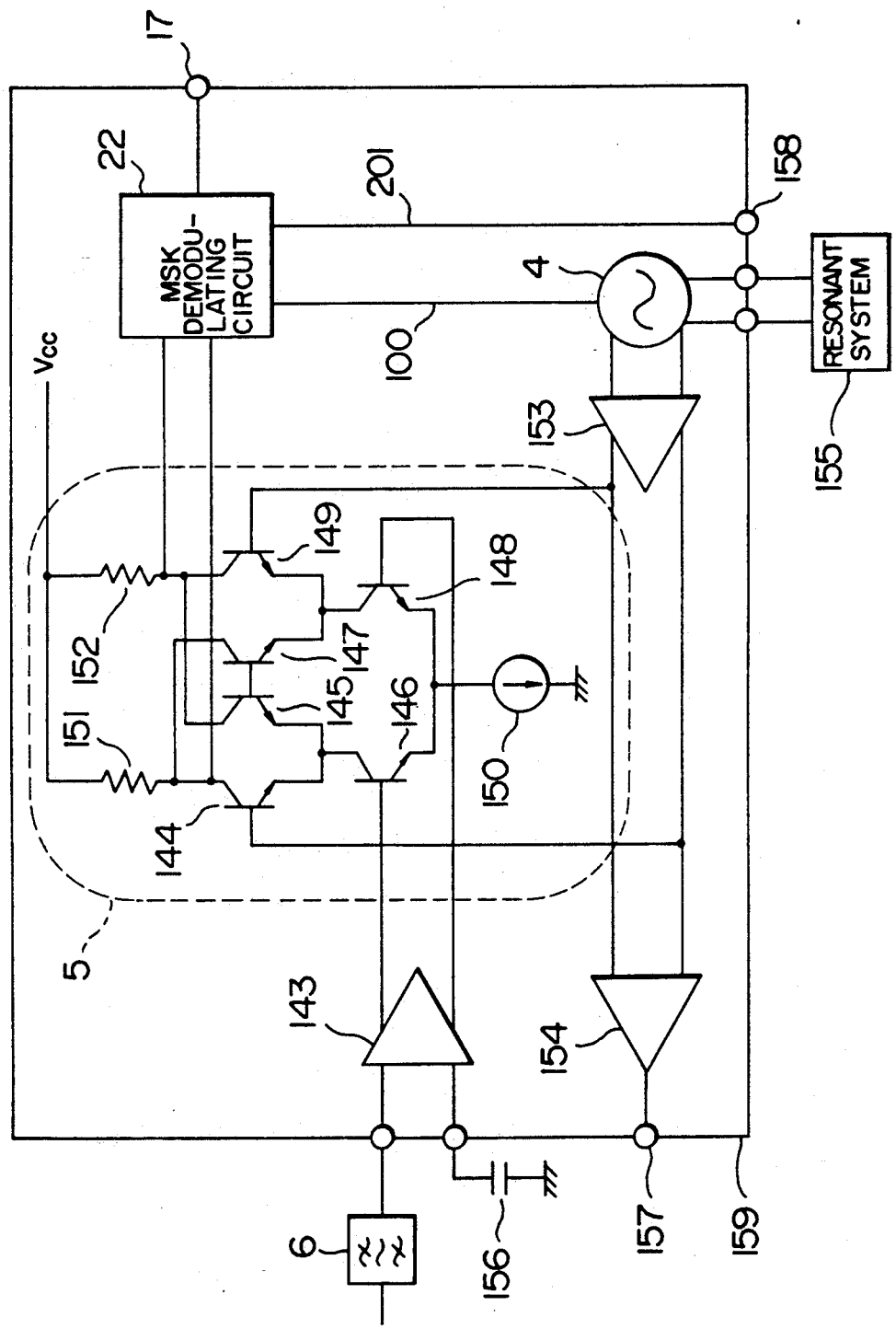
FIG. 21 is a block diagram showing a receiving circuit according to a ninth embodiment of the present invention.

FIG. 21 is a block diagram showing a demodulating circuit according to a ninth embodiment of the present invention. The same functional blocks shown in FIG. 21 as those shown in the other drawings have the same reference numbers. In FIG. 21, reference 143, 153 and 154 are amplifiers, 144, 145, 146, 147, 148 and 149 are transistors, 150 is a current source, 151 and 152 are resistors, 155 is a resonant circuit, 156 is a capacitor, 157 is a monitor terminal for a local oscillating signal, 158 is an output terminal for a pseudo-locking signal, and 159 is an integrated circuit. A mixer 5 is a double balance mixer (DBM) arranged to have the transistors 144, 145, 146, 147, 148, 149, the current source 150, and the resistors 151, 152. This ninth embodiment is just one MSK demodulating IC 159. That is to say, the DBM 5, the MSK demodulating circuit 22 and the other peripheral circuits are integrated on one semiconductor substrate such as an Si substrate. This embodiment has the resonant circuit of the local oscillator 4 arranged outside of the integrated circuit. The resonant system may be built in the integrated circuit 159. The output of the local oscillator 4 is picked up at the monitor terminal 157. The area closed by a chained line can be integrated and thereby made smaller than the embodiments shown in FIGS. 12 to 14.

Figure 4:
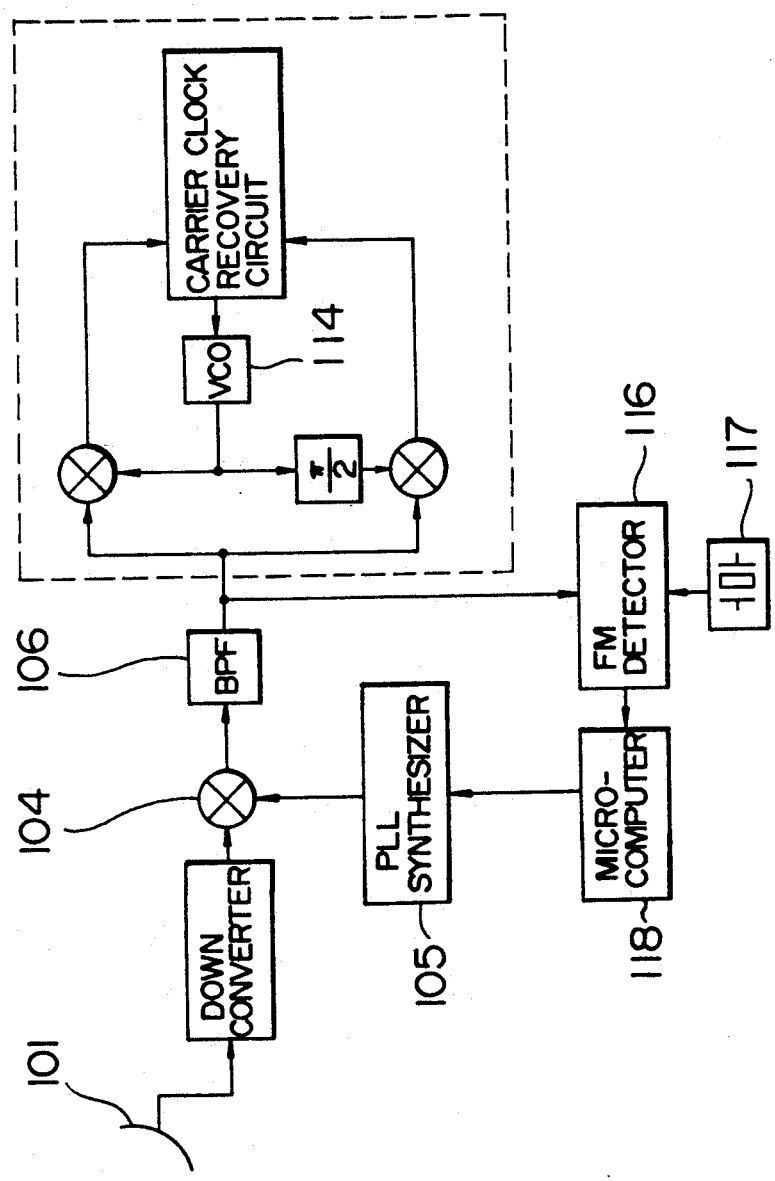
FIG. 4 is a block diagram showing another prior art.
Figure 22:
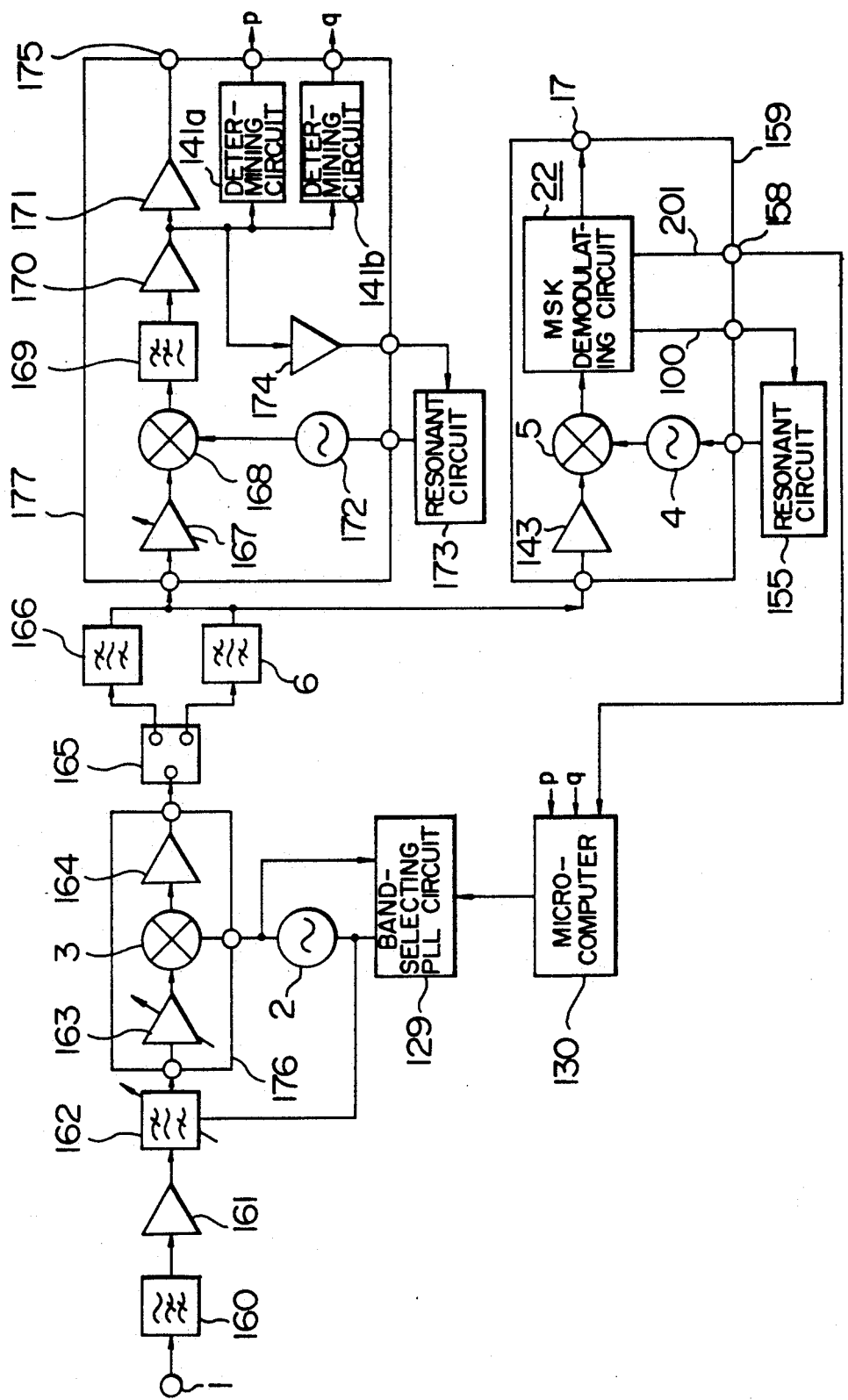
FIG. 22 is a block diagram showing a receiving circuit according to a tenth embodiment of the present invention.

FIG. 22 is a block diagram showing a demodulating circuit according to a tenth embodiment of the present invention. The same functional blocks shown in FIG. 22 as those shown in the other drawings have the same reference numbers. In FIG. 22, reference 141a and 141b are determining circuits. 160 is a BPF. 161 is a RF amplifier. 162 is a variable BPF. 163 is a radio frequency automatic gain control (RFAGC) amplifier. 164 is an IF amplifier. 165 is a switch. 166 is a BPF. 167 is an IFAGC amplifier. 168 is a phase comparator. 169 is a loop filter. 170 and 171 are buffer amplifiers. 172 is a voltage controlled oscillator. 173 is a resonant circuit. 174 is a loop amplifier. 175 is a base-band output terminal. 176 is a GaAs integrated circuit. 177 is an FM demodulating IC. This tenth embodiment is arranged to have an FM detector 116 of the prior art (see FIG. 4) and an FM demodulating IC 177 for demodulating a FM TV signal on the reference frequency signal 117 and detects the frequency variation. At a time, this embodiment provides a receiver for a FM TV signal and a MSK signal. The mixer 3, the RFAGC amplifier 163 and the IF amplifier 164 are integrated on one GaAs substrate. The FM demodulating IC 177 is arranged to have the IFAGC amplifier 167, the phase comparator 168, the loop filter 169, the buffer amplifiers 170, 171, the voltage controlled oscillator 172, the resonant circuit 173, and the determining circuit 141. For receiving the FM TV signal, the BPF 166 is selected and for receiving a MSK signal, the BPF 6 is selected. According to the tenth embodiment, when receiving the FM TV signal, the BPF 166 is selected so that the demodulating output may be obtained at the base-band output terminal 175. The demodulated output branched from the buffer amplifier 170 is determined in the determining circuits 141a and 141b. The circuits 141a and 141b supply the signals to the microcomputer 130, respectively. Based on the signals, the local oscillator 2 is controlled so that the AFC operation may be carried out. When the MSK signal is received, the BPF 6 is selected. The MSK demodulating IC 159 serves to perform the MSK demodulation. The FM demodulating IC 177 functions as the frequency variation detector 126 shown in FIG. 13.

As set forth above, the present invention can offer the following beneficial effects.

(1) The invention can implement a simply-arranged demodulating circuit which is capable of keeping the demodulating performance stable if the carrier frequency of a digital angle modulated signal such as a MSK-modulated signal or a QPSK-modulated signal is shifted from the central frequency and of stably operating if the input signal has a low C/N (carrier to noise) ratio.

(2) The invention can implement a stable and high-performance receiver for a CS audio broadcasting system using a communication satellite.

(3) The pull-in operation is not limited to the MSK demodulated signal. It may be applied to the QPSK demodulated signal.

(4) The MSK signal having a frequency-variable component resulting from the temperature change of an outdoor unit can be converted into a stable intermediate frequency without any frequency variation by the first frequency converter. If, therefore, the BPF is located between the first and the second mixers, the BPF does not attenuate the sideband wave as a result of the drift appearing in the second and the third local oscillators. This results in being able to allow the MSK demodulating circuit to operate in the optimum state and prevent the error ratio of the reproduced signal from being degraded.

What is claimed is:

1. A receiving circuit for receiving a suppressed carrier input signal, comprising:
    coherent detecting means for coherently detecting said suppressed carrier input signal;
    voltage controlled oscillating means for oscillating to said coherent detecting means as a recovered carrier;
    phase error detecting means for detecting a phase error signal between said suppressed carrier input signal and said recovered carrier, wherein said voltage controlled oscillating means is controlled by said phase error signal;
    synchronous state detecting means for detecting whether a carrier recovery phase locked loop circuit is in synchronous or asynchronous states, said carrier recovery phase locked loop including said coherent detecting means, said voltage controlled oscillating means and said phase error detecting means; and
    controlling means for controlling said voltage controlled oscillating means depending on a low-frequency component level of said phase error signal, so that an operating point of said carrier recovery phase locked loop circuit moves toward the center when an output of said synchronous state detecting means indicates that said carrier recovery phase locked loop is in the asynchronous state.

2. A receiving circuit as claimed in claim 1, wherein said controlling means comprises:
    a switch for intermittently breaking said phase error signal, wherein said switch is controlled by the output of said synchronous state detecting means;
    a low-pass filter through which a low-frequency component of said phase error signal is passed;
    an amplifier for amplifying said passed low-frequency component signal; and
    an adder for adding said amplified signal to said phase error signal for controlling said voltage controlled oscillating means.

3. A receiving circuit as claimed in claim 1, wherein said controlling means comprises:
    a low-pass filter through which a low-frequency component of said phase error signal is passed;
    an A/D converter for converting said passed low-frequency component signal into a digital data signal;
    an arithmetic processing means for arithmetically processing said A/D converted digital data signal;
    a D/A converter for converting said processed digital data signal into an analog signal; and
    an adder for adding said D/A converted analog signal to said phase error signal for controlling said voltage controlled oscillating means.

4. A receiving circuit as claimed in claim 3, further comprising:
sweeping means for sweeping the frequency oscillated by said voltage controlled oscillating means;
wherein said sweeping means is operated for performing a synchronous pull-in operation when the output of said synchronous state detecting means indicates the asynchronous state and stops said sweeping operation when said synchronous state detecting means detects the synchronous state.

5. A receiving circuit as claimed in claim 3, further comprising:
sweeping means for sweeping the frequency oscillated by said voltage controlled oscillating means;
wherein said sweeping means is operated for performing a synchronous pull-in operation when the output of said synchronous state detecting means indicates the asynchronous state and stops said sweeping operation when said synchronous state detecting means detects the synchronous state.

6. A receiving circuit for receiving a suppressed carrier input signal used in a heterodyne receiver, comprising:
voltage controlled oscillating means for local oscillation;
mixing means for down-converting said suppressed carrier input signal into an intermediate frequency band;
down-converted coherent detecting means for coherently detecting said suppressed carrier input signal;
reference oscillating means for oscillating said intermediate frequency signal to said coherent detecting means as a recovered carrier;
phase error detecting means for detecting a phase error signal between said down-converted suppressed carrier input signal and said recovered carrier, wherein said voltage controlled oscillating means is controlled by said phase error signal;
synchronous state detecting means for detecting whether a carrier recovery phase locked loop circuit is in synchronous or asynchronous states, said carrier recovery phase locked loop including said voltage controlled oscillating means, said mixing means, said coherent detecting means, said reference oscillating means and said phase error detecting means; and
controlling means for controlling said voltage controlled oscillating means depending on a low-frequency component level of said phase error signal, so that an operating point of said carrier recovery phase locked loop circuit moves toward the center when an output of said synchronous state detecting means indicates that said carrier recovery phase locked loop is in the asynchronous state.

7. A receiving circuit as claimed in claim 6, wherein said controlling means comprises:
a switch for intermittently breaking said phase error signal, wherein said switch is controlled by the output of said synchronous state detecting means;
a low-pass filter through which a low-frequency component of said phase error signal is passed;
an amplifier for amplifying said passed low-frequency component signal; and
an adder for adding said amplified signal to said phase error signal for controlling said voltage controlled oscillating means.

8. A receiving circuit as claimed in claim 2, wherein said controlling means comprises:
a low-pass filter through which a low-frequency component of said phase error signal is passed;
an A/D converter for converting said passed low-frequency component signal into a digital data signal;
an arithmetic processing means for arithmetically processing said A/D converted digital data signal;
a D/A converter for converting said processed digital data signal into an analog signal; and
an adder for adding said D/A converted analog signal to said phase error signal for controlling said voltage controlled oscillating means.

9. A receiving circuit as claimed in claim 7, further comprising:
sweeping means for sweeping the frequency oscillated by said voltage controlled oscillating means;
wherein said sweeping means is operated for performing a synchronous pull-in operation when the output of said synchronous state detecting means indicates the asynchronous state and stops said sweeping operation when said synchronous state detecting means detects the synchronous state.

10. A receiving circuit as claimed in claim 8, further comprising:
sweeping means for sweeping the frequency oscillated by said voltage controlled oscillating means;
wherein said sweeping means is operated for performing a synchronous pull-in operation when the output of said synchronous state detecting means indicates the asynchronous state and stops said sweeping operation when said synchronous state detecting means detects the synchronous state.

11. A receiving circuit for receiving a suppressed carrier input signal used in a heterodyne receiver, comprising:
first local oscillating means for first local oscillation;
first mixing means for down-converting said suppressed carrier input signal into a fist down-converted suppressed carrier input signal which occupies a first intermediate frequency band;
voltage controlled oscillating means for second local oscillation;
second mixing means for down-converting said first down-converted suppressed carrier input signal into a second down-converted suppressed carrier input signal which occupies a second intermediate frequency band;
coherent detecting means for coherently detecting said second down-converted suppressed carrier input signal;
reference oscillating means for oscillating a second intermediate frequency signal to said coherent detecting means as a recovered carrier;
phase error detecting means for detecting a phase error signal between said second down-converted suppressed carrier input signal and said recovered carrier, wherein said voltage controlled oscillating means is controlled by said phase error signal;
frequency variation detecting means for detecting a frequency variation from a desired frequency in an output of said voltage controlled oscillating means; and
controlling means for controlling said first local oscillating means depending on an output of said frequency variation detecting means, so that an oscillating frequency of said voltage controlled oscillating means is kept constant and said frequency variation from the desired frequency is approximately zero.

12. A receiving circuit as claimed in claim 11, wherein said frequency variation detecting means comprises:
   second reference oscillating means for oscillating a reference frequency corresponding to said desired frequency; and
   frequency comparing means for comparing an oscillating frequency of said voltage controlled oscillating means with an oscillating frequency of said second reference oscillating means;
   wherein said controlling means controls said first local oscillating means depending on the compared information of said frequency comparing means.

13. A receiving circuit as claimed in claim 11, wherein said frequency variation detecting means comprises:
   reference voltage supply means for supplying a reference voltage corresponding to said desired frequency; and
   voltage comparing means for comparing a controlling voltage of said voltage controlled oscillating means with said reference voltage;
   wherein said controlling means controls said first local oscillating means depending on the compared information of said voltage comparing means.

14. A receiving circuit as claimed in claim 11, further comprising:
   means for restricting a control range of said first local oscillating means.

15. A receiving circuit as claimed in claim 14, further comprising:
   means for stopping the control of said first local oscillating means when the oscillating frequency of said voltage controlled oscillating means is located near the center of a desired frequency.

16. A receiving circuit as claimed in claim 14, further comprising:
   means for detecting a pseudo-locking state of said MSK demodulating circuit and means for restring the control of said first local oscillator during said pseudo-locking state.

17. A receiving circuit as claimed in claim 11, wherein a carrier recovery phase locked loop circuit comprising said voltage controlled oscillating means, said second mixing means, said coherent detecting means, said reference oscillating means and said phase error detecting means, is formed on one Si-semiconductor substrate; and
   an oscillating signal output terminal of said voltage controlled oscillating means is provided.

18. A receiving circuit as claimed in claim 11, wherein said first mixing means is a semiconductor integrated circuit formed on a GaAs half-insulated substrate.

19. A receiving circuit as claimed in claim 11, wherein said first mixing means comprises a semiconductor integrated circuit formed on a GaAs half-insulated substrate and a semiconductor substrate.

20. A receiving circuit as claimed in claim 11, wherein said suppressed carrier input signal is an MSK signal;
   wherein said frequency variation detecting means comprises:
   FM demodulating means for demodulating said MSK signal which is down-converted into said first intermediate frequency band by said first mixing means;
   reference voltage supply means for supplying a reference voltage corresponding to said desired frequency; and
   voltage comparing means for comparing an output voltage of said FM demodulating means with said reference voltage;
   wherein said controlling means controls said first local oscillating means depending on the compared information of said voltage comparing means; and
   wherein said FM demodulating means is used for demodulating a TV signal when a FM TV signal is received.

21. A receiving circuit for receiving a suppressed carrier input signal, comprising:
   coherent detecting means for coherently detecting said suppressed carrier input signal;
   voltage controlled oscillating means for oscillating to said coherent detecting means as a recovered carrier;
   phase error detecting means for detecting a phase error signal between said suppressed carrier input signal and said recovered carrier, wherein said voltage controlled oscillating means is controlled by said phase error signal;
   synchronous state detecting means for detecting whether a carrier recovery phase locked loop circuit is in synchronous or asynchronous states, said carrier recovery phase locked loop including said coherent detecting means, said voltage controlled oscillating means and said phase error detecting means; and
   controlling means for controlling said voltage controlled oscillating means depending on a low-frequency component level of said phase error signal added to a ratio of said low-frequency component, so that an operating point of said carrier recovery phase locked loop circuit moves toward the center when an output of said synchronous state detecting means indicates that said carrier recovery phase locked loop is in the asynchronous state;
   wherein said ratio of said low-frequency component is dependent on a result from said synchronous state detector.

22. A receiving circuit for receiving a suppressed carrier input signal used in a heterodyne receiver, comprising:
   voltage controlled oscillating means for local oscillation;
   mixing means for down-converting said suppressed carrier input signal into an intermediate frequency band;
   down-converted coherent detecting means for coherently detecting said suppressed carrier input signal;
   reference oscillating means for oscillating said intermediate frequency signal to said coherent detecting means as a recovered carrier;
   phase error detecting means for detecting a phase error signal between said down-converted suppressed carrier input signal and said recovered carrier, wherein said voltage controlled oscillating means is controlled by said phase error signal;
   synchronous state detecting means for detecting whether a carrier recovery phase locked loop circuit is in synchronous or asynchronous states, said carrier recovery phase locked loop including said voltage controlled oscillating means, said mixing means, said coherent detecting means, said reference oscillating means and said phase error detecting means; and controlling means for controlling said voltage controlled oscillating means depending on a low-frequency component level of said phase error signal added to a ratio of said low-frequency component, so that an operating point of said carrier recovery phase locked loop circuit moves toward the center when an output of said synchronous state detecting means indicates that said carrier recovery phase locked loop is in the asynchronous state;

wherein said ratio of said low-frequency component is dependent on a signal from said synchronous state detector.

23. A receiving circuit for receiving a suppressed carrier input signal used in a heterodyne receiver, comprising:

first local oscillating means for first local oscillation;

first mixing means for down-converting said suppressed carrier input signal into a fist down-converted suppressed carrier input signal which occupies a first intermediate frequency band;

voltage controlled oscillating means for second local oscillation;

second mixing means for down-converting said first down-converted suppressed carrier input signal into a second down-converted suppressed carrier input signal which occupies a second intermediate frequency band;

coherent detecting means for coherently detecting said second down-converted suppressed carrier input signal;

reference oscillating means for oscillating a second intermediate frequency signal to said coherent detecting means as a recovered carrier;

phase error detecting means for detecting a phase error signal between said second down-converted suppressed carrier input signal and said recovered carrier, wherein said voltage controlled oscillating means is controlled by said phase error signal;

frequency variation detecting means for detecting a frequency variation form a desired frequency in an output of said voltage controlled oscillating means; and controlling means for controlling said first local oscillating means depending on an output of said frequency variation detecting means added to a ratio of said frequency component, so that an oscillating frequency of said voltage controlled oscillating means is kept constant and said frequency variation from the desired frequency is approximately zero;

wherein said ratio of said frequency component is dependent on a signal from said frequency variation detecting means.

24. A receiving circuit as claimed in claim 23, wherein said frequency variation detecting means comprises:

second reference oscillating means for oscillating a reference frequency corresponding to said desired frequency; and frequency comparing means for comparing an oscillating frequency of said voltage controlled oscillating means with an oscillating frequency of said second reference oscillating means;

wherein said controlling means controls said first local oscillating means depending on the compared information of said frequency comparing means.

25. A receiving circuit for receiving a radio frequency input signal, comprising:

down-converting means for down-converting said input signal into an intermediate frequency signal, wherein said down-converting means comprises a voltage controlled oscillator and a mixer;

coherent detecting means for coherently detecting said intermediate frequency signal, wherein said coherent detecting means comprises a second oscillator, and wherein said coherent detecting means outputs a first data signal corresponding to an in-phase component of said second oscillator and a second data signal corresponding to a 90 degree out-of-phase component of said second oscillator;

phase error detecting means for detecting a phase error signal between said intermediate frequency signal and an output signal of said second oscillator, wherein said voltage controlled oscillator is at least partially controlled by said phase error signal;

synchronous state detecting means for detecting whether a carrier recovery phase locked loop circuit is in synchronous or asynchronous states, said carrier recovery phase locked loop including said coherent detecting means, said voltage controlled oscillator and said phase error detecting means; and controlling means for controlling said voltage controlled oscillator depending on a low-frequency component level of said phase error signal added to a ratio of said low-frequency component, so that an operating point of said carrier recovery phase locked loop circuit moves toward the center when an output of said synchronous state detecting means indicates that said carrier recovery phase locked loop is in the asynchronous state;

wherein said ratio of said low-frequency component is dependent on a result from said synchronous state detecting means.

26. A receiving circuit for receiving a radio frequency input signal, comprising:

down-converting means for down-converting said input signal into an intermediate frequency signal, wherein said down-converting means comprises a voltage controlled oscillator and a mixer;

coherent detecting means for coherently detecting said intermediate frequency signal, wherein said coherent detecting means comprises a second oscillator and wherein said coherent detecting means outputs a first detected signal corresponding to an in-phase component of said second oscillator and a second detected signal corresponding to a 90 degree out-of-phase component of said second oscillator;

phase error detecting means for detecting a phase error between said intermediate frequency signal and an output signal of said second oscillator from said first detected signal and said second detected signal and producing a phase error signal, wherein said voltage controlled oscillator is at least partially controlled by said phase error signal;

synchronous state detecting means for detecting whether a carrier recovery phase locked loop circuit is in synchronous or asynchronous states, said carrier recovery phase locked loop including said coherent detecting means, said voltage controlled oscillator and said phase error detecting means; and correcting means for correcting the control signal of said voltage controlled oscillator, comprising:

biasing means for biasing said voltage controlled oscillator wherein said voltage controlled oscillator is caused to return to a center of an operable band of said down-converting means in the absence of a signal indicating the synchronous state;

phase error signal amplification means for amplifying a low-frequency component of said phase error signal;

adding means for adding said amplified low-frequency component signal with said phase error signal; and switch means for enabling or disabling said adding operation, wherein said switch means is controlled by the output of said synchronous state detecting means;

wherein said voltage controlled oscillator is at least partially controlled by said phase error signal amplification means.

* * * * *